United States Patent
Czaplik et al.

(10) Patent No.: US 10,221,326 B2
(45) Date of Patent: Mar. 5, 2019

(54) PRODUCTION OF RED IRON OXIDE PIGMENT

(71) Applicants: LANXESS Deutschland GmbH, Cologne (DE); LANXESS Specialty Chemicals Co., Ltd., Shanghai (CN)

(72) Inventors: Waldemar Czaplik, Burscheid (DE); Juergen Kischkewitz, Ratingen (DE); Wolfgang Oehlert, Shanghai (CN); Huajun Li, Shanghai (CN)

(73) Assignee: LANXESS Deutschland GmbH, Cologne (DE)

( * ) Notice: Subject to any disclaimer, the term of this patent is extended or adjusted under 35 U.S.C. 154(b) by 357 days.

(21) Appl. No.: 15/034,218

(22) PCT Filed: Nov. 8, 2013

(86) PCT No.: PCT/CN2013/086804
§ 371 (c)(1),
(2) Date: May 4, 2016

(87) PCT Pub. No.: WO2015/066905
PCT Pub. Date: May 14, 2015

(65) Prior Publication Data
US 2016/0272836 A1    Sep. 22, 2016

(51) Int. Cl.
*B01D 53/00* (2006.01)
*C09D 17/00* (2006.01)
(Continued)

(52) U.S. Cl.
CPC ......... *C09D 17/007* (2013.01); *B01D 53/005* (2013.01); *B01D 53/007* (2013.01); *B01D 53/56* (2013.01); *B01D 53/78* (2013.01); *B01J 8/00* (2013.01); *B01J 10/00* (2013.01); *C01G 49/06* (2013.01); *C02F 1/58* (2013.01); *C02F 1/586* (2013.01); *C09C 1/24* (2013.01);
(Continued)

(58) Field of Classification Search
None
See application file for complete search history.

(56) References Cited

U.S. PATENT DOCUMENTS 1,327,061 A   1/1920   Penniman et al.
1,368,748 A   2/1921   Penniman et al.
(Continued)

FOREIGN PATENT DOCUMENTS

CN   19981012321 A   7/1999
CN   1699477 A   11/2005
(Continued)

OTHER PUBLICATIONS

Shen, Qing, et al., "Preparation of crystal seeds of iron oxide red by nitric acid method and its effect on oxidation", Wujiyan Gongye (1997), (6), 5-6, Wujiyan Gonge Bianjib, four pages.
(Continued)

*Primary Examiner* — Anita Nassiri-Motlagh

(57) ABSTRACT

The present invention relates to an improved process for producing red iron oxide pigments by the Penniman process with nitrate (also called nitrate process or direct red process) and to apparatus for implementing this process, and also to the use of the plant for producing red iron oxide pigments by the Penniman process with nitrate.

20 Claims, 17 Drawing Sheets

(51) Int. Cl.

| | | |
|---|---|---|
| *C01G 49/06* | (2006.01) | |
| *C09C 1/24* | (2006.01) | |
| *B01D 53/56* | (2006.01) | |
| *B01D 53/78* | (2006.01) | |
| *B01J 8/00* | (2006.01) | |
| *B01J 10/00* | (2006.01) | |
| *C02F 1/58* | (2006.01) | |
| *C02F 101/16* | (2006.01) | |
| *C02F 103/34* | (2006.01) | |

(52) U.S. Cl.
CPC ............... *B01D 2259/804* (2013.01); *B01J 2208/00893* (2013.01); *C01P 2004/64* (2013.01); *C01P 2006/12* (2013.01); *C02F 2101/16* (2013.01); *C02F 2103/34* (2013.01)

(56) References Cited

U.S. PATENT DOCUMENTS

| | | | |
|---|---|---|---|
| 2,937,927 | A | 5/1960 | Ayers |
| 3,946,103 | A | 3/1976 | Hund |
| 4,753,680 | A | 6/1988 | Burow et al. |
| 5,421,878 | A | 6/1995 | Lerch et al. |
| 6,056,928 | A | 5/2000 | Fetzer et al. |
| 6,179,908 | B1 | 1/2001 | Braun et al. |
| 6,503,315 | B1 | 1/2003 | Etzenbach et al. |
| 6,616,747 | B2 | 9/2003 | Sumita |
| 7,144,455 | B2 | 12/2006 | Meisen et al. |
| 7,294,191 | B2 | 11/2007 | Rosenhahn et al. |
| 7,604,793 | B2 | 10/2009 | Koningen et al. |
| 8,206,681 | B2 | 6/2012 | Garetto |
| 9,428,402 | B2 | 8/2016 | Ketteler et al. |
| 2003/0170163 | A1 | 9/2003 | Banerjee et al. |
| 2014/0205664 | A1* | 7/2014 | Ketteler ............... C01G 49/06 424/464 |
| 2017/0267544 | A1 | 9/2017 | Czaplik et al. |
| 2017/7253745 | | 9/2017 | Czaplik et al. |
| 2017/0292024 | A1 | 10/2017 | Czaplik et al. |

FOREIGN PATENT DOCUMENTS

| | | | |
|---|---|---|---|
| EP | 0059248 A1 | 9/1982 | |
| EP | 0645437 B1 | 3/1997 | |
| JP | 6320367 A2 | 1/1988 | |
| JP | 2013193939 A2 | 9/2013 | |
| KR | 20090104327 A | 10/2009 | |
| RU | 2047556 C1 | 11/1995 | |
| SU | 1458368 A1 | 2/1989 | |
| WO | WO-2013045608 A1 * | 4/2013 | ............. C01G 49/06 |

OTHER PUBLICATIONS

Ullmann's Encyclopedia of Industrial Chemistry, Inorganic Pigments, Chapter 3.1.1, Iron Oxide Pigments, pp. 61-67.
Supplementary European Search Report from corresponding European Application No. 13896932, dated Apr. 12, 2017, two pages.
Russian Search Report from corresponding Russian Application No. 2016122481/05, dated Oct. 23, 2017, two pages.
Colombian Search Report from corresponding Colombian Application No. 16-119040, dated prior to Oct. 23, 2017, 14 pages.
International Search Report from International Application No. PCT/CN2013/086804, dated Jul. 23, 2014, two pages.

* cited by examiner

PRODUCTION OF RED IRON OXIDE PIGMENT

The present invention relates to an improved process for producing red iron oxide pigments by the Penniman process with nitrate (also called nitrate process or direct red process) and to apparatus for implementing this process, and also to the use of the plant for producing red iron oxide pigments by the Penniman process with nitrate.

Iron oxides are employed in many areas of industry. They are used, for example, as colour pigments in ceramics, building materials, plastics, inks, paints and paper, serve as a basis for various catalysts or support materials, and are able to adsorb or absorb pollutants. Magnetic iron oxides find applications in magnetic memory media, toners or ferrofluids or in medical applications such as, for example, as contrast agents for magnetic resonance tomography.

Iron oxides can be obtained by aqueous precipitation and hydrolysis reactions of iron salts (Ullmann's Encyclopedia of Industrial Chemistry, VCH Weinheim 2006, Chapter 3.1.1. Iron Oxide Pigments, pp. 61-67). Iron oxide pigments via the precipitation process are produced from iron salt solutions and alkaline compounds in the presence of air. Through targeted control of the reaction it is also possible in this way to prepare finely divided goethite, magnetite and maghaemite particles. The red pigments produced by this process, however, exhibit comparatively low colour saturation and are therefore employed primarily in the building materials industry.

The aqueous preparation of finely divided haematite, corresponding to the $\alpha$-$Fe_2O_3$ modification, is much more complicated, however. As a result of the use of a ripening step, it is also possible to produce haematite by direct aqueous precipitation with addition of a finely divided iron oxide in the maghaemite modification, $\gamma$-$Fe_2O_3$, or lepidocrocite modification, $\gamma$-FeOOH, as nucleus material [U.S. Pat. No. 5,421,878; EP0645437; WO 2009/100767].

A further method for producing red iron oxide pigments is the Penniman process (U.S. Pat. No. 1,327,061; U.S. Pat. No. 1,368,748; U.S. Pat. No. 2,937,927; EP 1106577A; U.S. Pat. No. 6,503,315). In that process, iron oxide pigments are prepared by dissolving and oxidizing metallic iron with addition of an iron salt and an iron oxide nucleus. Disclosed accordingly in SHEN, Qing; SUN, Fengzhi; Wujiyan Gongye 1997, (6), 5-6 (CH), Wujiyan Gongye Bianjib, (CA 128:218378n) was a process in which dilute nitric acid acts at elevated temperature on iron. This produces a haematite nucleus suspension. That suspension is built up in a conventional way to form a suspension of red pigment, and the pigment is isolated from this suspension, if desired, in a way which is customary perse. The colour saturation of the red pigments produced by this process, however, is comparatively low, similar to the colour saturation of a commercial 130-grade product, and these pigments are therefore used primarily in the building materials industry. EP 1106577A discloses a variant of the Penniman process, encompassing the exposure of iron to dilute nitric acid at elevated temperature for the purpose of producing nuclei, i.e. finely divided iron oxides having a particle size of less than or equal to 100 nm. The reaction of iron with nitric acid is a complex reaction and, depending on experimental conditions, may lead either to the passivation of the iron and hence to reaction standstill, or to dissolution of the iron with formation of dissolved iron nitrate. Both reaction pathways are undesirable, and the production of finely divided haematite is accomplished only under certain conditions. EP 1106577A describes such conditions for the production of finely divided haematite. The iron there is brought to reaction with dilute nitric acid at temperatures between 90 and 99° C. WO 2013/045608 describes a process for producing red iron oxide pigments in which the reaction step of the production of the nuclei, i.e. of finely divided haematite having a particle size of less than or equal to 100 nm, has been improved.

These inherently efficient processes, which allow direct production of high-grade red iron oxides with a large variation in the colour values, nevertheless suffer from the following disadvantages:

1. Emission of nitrogen oxides of the formula $NO_m$, in which the nitrogen may have different oxidation numbers between +1 and +5. Nitrogen oxides may be toxic (examples being the nitrous gases NO, $NO_2$ and $N_2O_4$, also identified generally as "$NO_x$"); they generate smog, destroy the atmospheric ozone layer under UV irradiation, and are greenhouse gases. Dinitrogen monoxides specifically is a stronger greenhouse gas than carbon dioxide by a factor of approximately 300. Dinitrogen monoxide, moreover, is now considered to be the most powerful ozone killer. In the case of the Penniman process with nitric acid, the nitrous gases NO and $NO_2$ and dinitrogen monoxide as well, are formed in significant quantities.
2. The Penniman process with nitric acid gives rise to nitrogen-containing waste waters, which contain significant amounts of nitrates, nitrites and ammonium compounds.
3. The Penniman process with nitric acid is very energy-intensive, since it involves having to heat large volumes of aqueous solutions to temperatures from 60° C. to 120° C. by external energy supply. Additionally, as a result of the introduction of oxygen-containing gases as oxidizing agents into the reaction mixture, energy is removed from the reaction mixture (steam stripping), and must be supplied again in the form of heat.

The object was therefore to provide an efficient and eco-friendly process for producing red iron oxide pigments that avoids the above-stated disadvantages, with on the one hand the red iron oxide pigments being produced with a broad colour spectrum in high yield and on the other hand the fraction of nitrogen-containing by-products given off to the environment being minimized.

A process for producing red iron oxide pigments has now been found that achieves this object and also provides apparatus in which this process can be carried out on the industrial scale as well.

The process of the invention comprises at least the steps of a) preparing an iron(II) nitrate solution by reaction of iron with nitric acid, thereby producing a first nitrogen oxide-containing stream, and optionally subsequently separating any unreacted iron from the iron(II) nitrate solution thus prepared, b) preparing an aqueous haematite nucleus suspension by reaction of iron with nitric acid, thereby producing a second nitrogen oxide-containing stream, and optionally subsequently separating any unreacted iron from the haematite nucleus suspension thus prepared, c) preparing an aqueous haematite pigment suspension by
   I. reacting the aqueous haematite nucleus suspension from step b) with the iron(II) nitrate solution from step a) and at least one alkaline precipitant in the presence of at least one oxygen-containing gas, and/or by II. reacting the aqueous haematite nucleus suspension from step b) with the iron(II) nitrate solution from step a), iron, and at least one oxygen-containing gas, thereby producing a third nitrogen oxide-containing stream.

d) isolating the haematite pigment present in the aqueous haematite pigment suspension from the aqueous phase, e) oxidizing the second nitrogen oxide-containing stream from step b), producing an oxidized second nitrogen oxide-containing stream.

f) contacting the first nitrogen oxide-containing stream and/or the third nitrogen oxide-containing stream and/or the oxidized second nitrogen oxide-containing stream from step e) with an aqueous wash phase, thereby producing a prepurified gas stream and a wash phase enriched with nitric acid.

g) Removing dinitrogen monoxide and/or nitrous gases from the prepurified gas stream from step f) by heating to a temperature of 200 to 1400° C., optionally in the presence of at least one catalyst, preferably of 250 to 500° C. in the presence of at least one catalyst and/or from 800 to 1400° C. in the absence of a catalyst, thereby producing a purified gas stream.

In one preferred embodiment the process of the invention comprises, further to steps a) to g), the step h) removing of at least ammonium compounds and/or nitrite compounds and/or nitrate compounds, very especially of at least ammonium compounds, nitrate compounds and nitrite compounds, from the aqueous phase from step d), by means of methods known per se to the skilled person, producing a purified wastewater and optionally a salt-enriched wastewater.

In a further preferred embodiment, the process of the invention comprises, further to steps a) to g) or a) to h), one or more of the steps of i) returning the nitric acid-enriched wash phase formed in step f) to step a), and/or b) and/or c), and/or j) utilizing the heated purified gas stream from step g) to preheat the prepurified gas stream from step f), forming a preheated, prepurified gas stream and a cooled, purified waste gas.

It may be noted at this point that the scope of the invention encompasses all desired and possible combinations of those components, value ranges and/or process parameters that are given above and set out below, whether general or specified in ranges of preference.

The iron used commonly comprises iron in the form of wire, sheets, nails, nodules or coarse filings. The individual pieces in that case are of any desired shape, and customarily have a thickness (measured, for example, as the diameter of a wire or the thickness of a sheet) of around 0.1 millimeter up to about 10 millimeters. The size of wire bundles or of sheets which are used in the process is typically determined by aspects of practicability. Hence it must be possible to charge the reactor with this starting material, without difficulties, generally through a manhole. Such iron is generated, among other ways, as scrap, or as a by-product in the metal-processing industry, examples being punched metal sheets.

The iron used in the process of the invention generally has an iron content of >90%. Impurities occurring in this iron are customarily extraneous metals such as manganese, chromium, silicon, nickel, copper, for example, and other elements. Iron with a high purity, however, can also be used without disadvantages.

The nitric acid used in steps a) and b) in the process of the invention preferably has concentrations of 10 to 67 wt % $HNO_3$, preferably of 20 to 67 wt % $HNO_3$. In steps b) and/or c), besides the nitric acid, it is also possible for another acid to be used, such as hydrochloric acid or sulphuric acid, for example. Preferably no further acid apart from the nitric acid is used in these process steps. This has the advantage that the aqueous haematite nucleus suspension obtainable by the process of the invention, and the haematite, have a very low sulphur content and chlorine content. This is an advantage for use in catalysts, since for certain reactions sulphur and chlorine constitute known catalyst poisons.

The iron(II) nitrate solutions typically have concentrations of 50 to 300 g/l $Fe(NO_3)_2$ (figure based on anhydrous solid). Besides $Fe(NO_3)_2$, the iron(II) nitrate solutions may also include quantities of 0 to 50 g/l $Fe(NO_3)_3$. A very low amount of $Fe(NO_3)_3$, however, is advantageous.

Nitrogen oxides for the purposes of the present invention are nitrogen-oxygen compounds of the general formula $NO_y$. This group includes the nitrous gases (also called $NO_x$) of the general formula $NO_m$, where the nitrogen can have different oxidation numbers between +1 and +5.

Examples thereof are NO (nitrogen monoxide, m=1, oxidation number +2), $NO_2$ (nitrogen dioxide, m=2, oxidation number +4), and $N_2O_5$ (m=2.5, oxidation number +5. $NO_2$ is in a temperature- and pressure-dependent equilibrium with its dimer $N_2O_4$ (both oxidation number +IV). Below, $NO_2$ shall refer both to $NO_2$ itself and to its dimer $N_2O_4$. $N_2O$ (dinitrogen monoxide, laughing gas, m=0.5, oxidation number +1) also belongs to the group of the nitrogen oxides of the general formula $NO_y$, but is not counted as being among the nitrous gases.

The first nitrogen oxide-containing stream from steps a), or the third nitrogen oxide-containing stream from step c) of the process of the invention typically contain 1 to 200 $g/m^3$ of nitrous gases (calculated as $g/m^3$ $NO_2$) and/or 0.5 to 50 $g/m^3$ of $N_2O$. The amount of nitrous gases and dinitrogen monoxide in these streams may fluctuate within wide ranges. Step a) of the process of the invention generally produces small amounts of nitrous gases and dinitrogen monoxide, which customarily accumulate above the reaction mixture in the reactor, since these reactors are customarily closed. Introduction of air or inert gases, such as nitrogen, also called extraneous air, into the reactor by suction or blowing produces the first nitrogen oxide-containing stream.

In step b) of the process of the invention, generally, according to reaction regime, significantly higher amounts of nitrous gases and dinitrogen monoxide are produced than in the case of step a), and these amounts likewise accumulate over the reaction mixture in the reactor if these reactors are closed, or are forced into the lines connected to the reactor if the reactors are open, when the permissible pressures are exceeded, for example. Through introduction of air or inert gases, for example nitrogen, also called extraneous air, into the reactor by suction or blowing, streams with defined levels of nitrous gases and dinitrogen monoxide may then be generated. The amount of nitrous gases and dinitrogen monoxide in these streams is then dependent on the amount of these gases formed during the reaction, and on the amount of extraneous air fed into the apparatus, and on the duration of the extraneous air feed, and may consequently be adjusted to desired levels advantageous for the further process steps. It may be advantageous to combine the first and second nitrogen oxide-containing streams after emergence from the reactors, or to introduce the first nitrogen oxide-containing gas stream as a substitute for extraneous air into the reactor for step b). The resultant combined first and second nitrogen oxide-containing stream typically contains 1 to 50 g/m³ of nitrous gases (calculated as g/m³ $NO_2$) and/or 1 to 50 g/m³ of dinitrogen monoxide.

The second nitrogen oxide-containing stream from step b) of the process of the invention typically has a concentration of 1 to 2000 g/m³ of nitrous gases (calculated as g/m³ $NO_2$), and 0.5 to 2000 g/m³ of dinitrogen monoxide. As a result of the introduction of at least one oxygen-containing gas into the reactor during the reaction, the second nitrogen oxide-containing stream is generated. The amount of nitrous gases and dinitrogen monoxide may consequently also be adjusted via the flow rate of the at least one oxygen-containing gas.

The oxidized second nitrogen oxide-containing stream obtained after step e) typically contains not more than 50%, preferably less than 30%, more preferably less than 15% of the original fraction of nitrogen monoxide, i.e. the fraction present prior to step f).

The aqueous haematite nucleus suspension prepared in step b) typically has concentrations of 50 to 300 g/l haematite, preferably from 80 to 150 g/l haematite. The haematite nuclei prepared in accordance with step b) and present in the aqueous haematite nucleus suspension have a particle size, for example, of less than or equal to 100 nm and/or a specific BET surface area of 40 m²/g to 150 m²/g. This haematite ($\alpha$-$Fe_2O_3$) may also contain fractions of other phases, e.g. goethite ($\alpha$-FeOOH) and/or ferrihydrite (5 $Fe_2O_3$.9$H_2O$).

The at least one alkaline precipitant from step c) in variant I. is, for example, NaOH, KOH, $Na_2CO_3$, $K_2CO_3$, $NH_3$ or $NH_4OH$, or other alkali metal and alkaline earth metal hydroxides and carbonates, or any desired mixtures thereof. Preference is given to using alkali metal hydroxides or alkali metal carbonates, particular preference to using NaOH.

The at least one oxygen-containing gas from step c) in variant I. or II. is, for example, air, oxygen, NO, $NO_2$, $O_3$, or mixtures of the stated gases. Air is preferred.

The isolation of the haematite pigment present in the aqueous haematite pigment suspension from the aqueous phase in accordance with step d) is accomplished preferably by sedimentation, filtration or centrifugation. The aqueous phase removed includes, among other components, nitrate compounds, nitrite compounds and ammonium compounds and thus typically has a total nitrogen content of 0.2 to 10 g/l nitrogen, preferably of 0.2 to 5 g/l nitrogen (calculated in each case on elemental nitrogen).

The red iron oxide pigment obtained by the process of the invention, also referred to alternatively as haematite pigment in connection with this invention, contains preferably 80 to 100 wt % of $\alpha$-$Fe_2O_3$, the crystal lattice of the $\alpha$-$Fe_2O_3$ containing 0 to 10 wt % of water of crystallization. The haematite obtained by the process of the invention has a broad colour spectrum. The colour of the haematite is influenced by particle size, particle size distribution, amount of water of crystallization and/or incorporation of extraneous atoms. The colour values are measured by methods known to the skilled person.

The aqueous wash phase is typically water or dilute nitric acid, preferably dilute nitric acid, more preferably nitric acid which is conveyed in circulation.

The nitric acid-enriched wash phase typically has an $HNO_3$ content of 1 to 67 wt %, preferably of 5 to 67 wt %.

The catalysts are preferably alternatively catalysts for the decomposition of nitrous gases and/or for the decomposition of dinitrogen monoxide. Examples of catalysts are activated carbons, silica gel, molecular sieves, vanadium-zinc catalysts or chromium-zinc catalysts.

The precleaned gas stream typically has a temperature of 20 to 90° C., preferably of 30 to 80° C., and comprises preferably not more than 50%, more preferably less than 30%, very preferably less than 15% of the original fraction of nitrous gases (calculated as $NO_2$), i.e. the fraction present prior to step f).

The preheated precleaned gas stream typically has a temperature of 250 to 500° C., more preferably of 300 to 450° C., and 0.5 to 20 g/m³ of nitrous gases (calculated as g/m³ $NO_2$), preferably 0.5 to 20 g/m³ of nitrous gases (calculated as g/m³ $NO_2$), and/or 1 to 40 g/m³ of $N_2O$.

The purified waste gas typically has a temperature of 150 to 1500° C., preferably of 150 to 500° C. The purified waste gas typically has from 0.001 to 0.3 g/m³ of nitrous gases (calculated as g/m³ of $NO_2$), preferably 0.005 to 0.3 g/m³ of nitrous gases (calculated as $NO_2$), and/or 0.001 to 0.3 g/m³ of $N_2O$, preferably 0.005 to 0.3 g/m³ of $N_2O$.

The cooled purified waste gas typically has a temperature of 80° C. to 450° C., preferably of 150 to 350° C. The cooled purified waste gas typically has from 0.001 to 0.3 g/m³ of nitrous gases (calculated as g/m³ of $NO_2$), preferably 0.005 to 0.3 g/m³ of nitrous gases (calculated as $NO_2$), and/or 0.001 to 0.3 g/m³ of $N_2O$, preferably 0.005 to 0.3 g/m³ of $N_2O$.

The purified wastewater contains only small residual amounts of dissolved nitrogen compounds. The purified wastewater typically has a total nitrogen content of not more than 0.2 g/l nitrogen, preferably not more than 0.1 g/l nitrogen, more preferably of not more than 0.02 g/l nitrogen (calculated in each case on elemental nitrogen).

The salt-enriched wastewater typically comprises salts which were not removed in the preceding purification steps. The salt-enriched wastewater preferably comprises sulphate.

Steps a) and/or b) may take place by any method known to the skilled person for the reaction of iron with nitric acid.

In step a), for example, 0.4 to 10 mol of iron per mol of nitric acid are reacted at a temperature of 60° C. or less, preferably from 10 to 60° C., to give an iron(II) nitrate solution. If an excess of iron is used, the iron(II) nitrate solution may easily be isolated from the unreacted iron. In the next batch, optionally, further iron and/or further nitric acid are added.

Steps b) and c) of the process of the invention may take place by any method known to the skilled person. Steps b) and c) are preferably carried out in accordance with the processes of EP 1106577A or WO 2013/045608.

This is accomplished, for example, by using step b) of the process of the invention to generate a haematite nucleus suspension, with the reaction temperature on exposure of the iron to the nitric acid being at least 90° C., preferably from 90 to 99° C.

In another preferred embodiment of step b), an aqueous haematite nucleus suspension is generated, with the nitric acid having a concentration of 2 to 6 wt % $HNO_3$ and being used in a molar reaction ratio of iron to nitric acid ($HNO_3$) of 1.5 to 16. In a further preferred embodiment of step b), an aqueous haematite nucleus suspension is generated, with the nitric acid having a concentration of 2 to 15 wt % $HNO_3$. In a further preferred embodiment of step b), iron to nitric acid ($HNO_3$) is used at a molar reaction ratio of 1.0 to 16.

In a further preferred embodiment of step b), an aqueous haematite nucleus suspension is prepared, with the haematite nuclei present in the aqueous haematite nucleus suspension having a particle size of less than or equal to 100 nm and a specific BET surface area of 40 m²/g to 150 m²/g, measured according to DIN 66131, with the preparation comprising at least the steps of:

i) providing a mixture of iron and water having a temperature of 60 to 120° C., ii) adding nitric acid to the mixture from step i), and iii) optionally subsequently separating any unreacted iron from the aqueous haematite nucleus suspension thus prepared.

In a further preferred embodiment, in step ii), the nitric acid is added to the mixture from step i) at a rate such that the reaction mixture preferably heats up by at least 15° C. within less than 120 minutes after the end of the addition of nitric acid, even without external supply of heat. Likewise preferably, the reaction mixture in step ii) reaches a maximum temperature of 105 to 160° C. Likewise preferably, steps i) and ii) take place in a pressure vessel. Likewise preferably, after the end of the addition of nitric acid in step ii), a drop in reaction temperature to less than 100° C. is awaited before step iii) is carried out.

In one preferred embodiment of variant I. of step c), the temperature during the reaction is 70 to 100° C., preferably 75 to 90° C. The iron(II) nitrate solution from step a) and at least one alkaline precipitant are metered in, and the reaction mixture is oxidized with at least one oxygen-containing gas, preferably with 0.2 to 100 liters of at least one oxygen-containing gas, preferably air, per hour and per liter of suspension, until the red iron oxide pigment achieves the desired color shade.

In one preferred embodiment of variant II. of step c), the haematite pigment suspension is prepared by the reaction of the haematite nucleus suspension with iron and iron(II) nitrate solution at temperatures of 70 to 100° C., preferably 75 to 90° C., and by oxidation with 0.2 to 100 liters of at least one oxygen-containing gas, preferably air, per hour and per liter of suspension, until the red iron oxide pigment achieves the desired color shade.

In a further preferred embodiment of variant II. of step c), the aqueous haematite nucleus suspension from step b) is reacted with the iron(II) nitrate solution from step a), and iron, at least one oxygen-containing gas and at least one sulphate salt, as for example iron(II) sulphate and/or an alkali metal or alkaline earth metal sulphate, preferably iron(II) sulphate and/or sodium sulphate, to give the red iron oxide pigment. The temperature in the reaction is 70 to 100° C., preferably 75 to 90° C. Used as at least one oxygen-containing gas is, preferably, air, the amount being preferably 0.2 to 50 l of air per hour and per liter of suspension until the red iron oxide pigment reaches the desired color shade.

In a further preferred embodiment of step c), the aqueous haematite nucleus suspension from step b) is reacted with the iron(II) nitrate solution from step a), at least with one alkaline precipitant, iron, at least one oxygen-containing gas and optionally at least one sulphate salt, as for example iron(II) sulphate and/or an alkali metal sulphate or alkaline earth metal sulphate, preferably iron(II) sulphate and/or sodium sulphate, to give the red iron oxide pigment. The temperature in the reaction is 70 to 100° C., preferably 75 to 90° C. The at least one alkaline precipitant is added more preferably at the end of the reaction, as for example at a residual concentration of iron(II) ions of less than or equal to 10 g/l, very preferably at a residual concentration of iron(II) ions of less than or equal to 5 g/l, to the reaction mixture, with the supply of the oxygen-containing gas being continued. The oxygen-containing gas used preferably comprises air, with the amount being preferably 0.2 to 50 l of air per hour and per liter of suspension until the red iron oxide pigment reaches the desired color shade.

Supply of the at least one oxygen-containing gas may be commenced, in all preferred embodiments, either during the heating phase of the reaction mixture composed of haematite nucleus suspension from step b), iron(II) nitrate solution from step a), and iron, or after the end of the heating phase.

The at least one sulphate salt, for example iron(II) sulphate and/or an alkali metal sulphate or alkaline earth metal sulphate, preferably iron(II) sulphate and/or sodium sulphate, may in all preferred embodiments be used in the form of a solution, suspension or solid. The solid in this case is in the form of the anhydrous compound or of different modifications containing water of crystallization. Iron(II) sulphate is used preferably in the form of the aqueous solution or in the form of the solid iron(II) sulphate heptahydrate or suspensions thereof.

In another preferred embodiment of step c), the at least one sulphate salt, for example iron(II) sulphate and/or an alkali metal sulphate or alkaline earth metal sulphate, preferably iron(II) sulphate and/or sodium sulphate, is added to the reaction mixture before and/or after commencement of the supply of the oxygen-containing gas. This has the advantage that less iron(II) nitrate solution has to be used and that sedimentation of the haematite pigment, formed during the reaction, from the haematite pigment suspension is accelerated. This facilitates the subsequent isolation of the haematite pigment in step d) of the process of the invention.

In step d) of the process of the invention, the isolation of the red iron oxide pigment present in the suspension is accomplished, preferably by filtration and/or sedimentation and/or centrifugation. Likewise preferably the filtercake is washed and subsequently the filtercake is dried. Likewise preferably, before the isolation of the red iron oxide pigment from the aqueous phase, one or more screening steps are carried out, more preferably with different mesh sizes and with descending mesh sizes. This has the advantage that by this means extraneous substances, for example metal pieces, which would otherwise contaminate the haematite pigment, are removed from the haematite pigment suspension.

For the isolation of the haematite pigment from the aqueous phase it is possible to carry out all of the methods known to the skilled person, for example sedimentation with subsequent removal of the aqueous phase, or filtration using filter presses, as for example using membrane filter presses.

In one preferred embodiment of step d), at least one sulphate salt, for example iron(II) sulphate and/or an alkali metal sulphate or alkaline earth metal sulphate, preferably iron(II) sulphate and/or sodium sulphate, may be added to the haematite pigment suspension during or before screening and/or during or before isolation. This has the advantage that the sedimentation of the haematite pigment from the haematite pigment suspension is accelerated. This facilitates the subsequent isolation of the red iron oxide pigment in step d) of the process of the invention.

Subsequently, optionally, there is at least one scrubbing of the filtercake or sediment thus isolated. After the isolation and/or the scrubbing, optionally, the red iron oxide pigment thus isolated is dried, for example with filter dryers, belt dryers, kneading dryers, spin flash dryers, drying cabinets or spray dryers. Drying takes place preferably using belt dryers, plate dryers, kneading dryers and/or spray dryers.

The oxidization of the second nitrogen oxide-containing stream from step b), in step e), is accomplished, for example, by contacting the second nitrogen oxide-containing stream with at least one oxidizing agent, optionally in the presence of one or more catalysts and/or of high-energy radiation, e.g. UV radiation. Oxidizing agents are typically air, oxygen, ozone or hydrogen peroxide, preferably air.

The oxidation takes place for example at a temperature of 20 to 300° C.

The oxidation takes place for example at a pressure of 0.08 MPa to 2 MPa (0.8 to 20 bar). Preferably the oxidation takes place at pressures between 0.08 MPa and 1 MPa (0.8 to 10 bar). Typically the oxidation is accelerated by higher pressure. One of the reactions during the oxidation of the second nitrogen oxide-containing stream is the oxidation of NO to $NO_2$.

In step f), the first nitrogen oxide-containing stream—and, where step c) has been carried out in accordance with variant II, the third nitrogen oxide-containing stream as well—and also the oxidized second nitrogen oxide-containing stream from step e) are contacted with an aqueous wash phase in order to produce a precleaned gas stream and a nitric acid-enriched wash phase. In this operation, in particular, $NO_2$ is removed from the nitrogen oxide-containing streams of steps a) and c) or from the oxidized nitrogen oxide-containing stream from step e).

Through the reaction of $NO_2$ with the aqueous wash phase, nitric acid is formed, and so the $HNO_3$ concentration of the aqueous wash phase rises continuously during the scrubbing of the $NO_2$-containing stream, until a desired final concentration is reached. The final $HNO_3$ concentration is preferably from 10 to 67 wt %, more preferably from 20 to 67 wt %. When the desired final $HNO_3$ concentration is reached, the nitric acid formed is removed from the scrub circuit and replaced by water or by nitric acid below the desired final $HNO_3$ concentration.

The precleaned gas stream obtained according to step f) of the process of the invention contains for example not more than 50%, preferably less than 30%, more preferably less than 15% of the original fraction of $NO_2$ present prior to step f). The NO present in the streams used in step f) dissolves in the aqueous phase to much less of an extent than $NO_2$, but the NO content is altered even during the scrub in part by equilibrium reactions or oxidation. $N_2O$ is soluble in the aqueous phase to a significantly lower extent than $NO_2$. The influence of the scrub on the $N_2O$ concentration of the gas stream is typically only slight.

Step g) is preferably carried out in the presence of one or more catalysts. Corresponding processes are sufficiently well known to the skilled person as DeNOx processes or else SCR (Selective Catalytic Reduction) or NSCR (Non-Selective Catalytic Reduction) processes. The process for the thermal decomposition of dinitrogen monoxide is also known under the DeN2O® process name.

The precleaned gas stream here is typically contacted with ammonia or with a chemical compound that decomposes to form ammonia, for example urea, in the presence of one or more catalysts, which may optionally have been applied to at least one support. The catalysts typically comprise titanium dioxide, vanadium pentoxide and tungsten oxide and/or zeolites and/or platinum and/or other metal oxides. The nitrous gases and the ammonia react here in a comproportionation reaction to form nitrogen and water, or to form nitrogen, carbon dioxide and water if urea rather than ammonia is used. At the same time, depending on the catalyst used, dinitrogen monoxide is split thermally into nitrogen and oxygen (decomposition catalysis). Dinitrogen monoxide, however, may also be split thermally before or after the removal of the other nitrogen oxides, without catalyst. For this purpose, the dinitrogen monoxide may be heated indirectly or directly to the required temperature. Direct heating takes place by combustion of carbonaceous fuels, for example natural gas or gasoline, in the presence of the waste gas containing dinitrogen monoxide. In this case carbon dioxide and nitrogen are formed directly. Step g) is carried out preferably in one stage and in the presence of at least one catalyst and in the presence of ammonia or at least one chemical compound that decomposes to form ammonia, for example urea. The precleaned gas stream from step f) is raised in this step to a temperature of 250 to 500° C., more preferably to 300 to 450° C.

In another embodiment, step g) is carried out in two stages. In that case the precleaned gas stream from step f) is
i) heated to a temperature of 250 to 500° C., more preferably to 300 to 450° C., and subsequently
ii) heated to a temperature of 800 to 1400° C.

In this case, in the first step, there is the catalytic DeNOx reaction, in which nitrogen oxides such as nitrogen monoxide and nitrogen dioxide are decomposed, and in the second step there is the uncatalyzed thermal decomposition of dinitrogen monoxide.

In step h) of the process of the invention, typically, iron-containing compounds, for example iron salts, especially iron(II) salts, and/or nitrogen-containing compounds, for example ammonium compounds, nitrate compounds or nitrite compounds, and/or sulphur-containing compounds, for example sulphate compounds, are removed from the aqueous phase from step d), for example by oxidative precipitation and/or denitrification and/or coagulation and/or flocculation and/or sedimentation and/or filtration and/or ultrafiltration and/or reverse osmosis. The cleaned wastewaters can be used again for chemical operations in the reactors or for other steps, for example as wash water for filtration operations.

For these purposes, wastewater from step d) of the process of the invention is denitrified, and/or subjected to at least one coagulating step, and/or subjected to at least one flocculating step, and/or subjected to at least one sedimenting step, and/or subjected to at least one filtering step, and/or subjected to at least one ultrafiltration step, and/or cleaned further by at least one reverse osmosis step.

The removal of ammonium compounds, nitrite compounds and nitrate compounds from the aqueous phase from step d) may take place by a variety of methods, as for example by means of biological denitrification or by the process known as the Anammox process.

In the case of biological denitrification, nitrate compounds dissolved in the wastewater are reduced to molecular nitrogen under anaerobic conditions, i.e. with exclusion of oxygen, by means of specific microorganisms. One specific variant of biological denitrification is the Anammox process, in which the microorganisms take up the carbon required for the denitrification, in the form of carbon dioxide. In other processes, the microorganisms must be provided with other carbon sources, for example alcohols such as methanol or ethanol.

Ammonium compounds and nitrite compounds dissolved in the wastewater may additionally be oxidized to nitrate compounds (nitrification) under aerobic conditions, i.e. in the presence of oxygen, by means of specific microorganisms. The steps of nitrification (aerobic) and denitrification (anaerobic) may be combined. For this purpose they may be carried out one after another, in which case the nitrification may take place after the denitrification, and/or the denitrification may take place after nitrification. In preferred embodiments, the steps of nitrification and denitrification are carried out multiply in succession. This has the advantage that, as a result, the amount of nitrogen compounds dissolved in the wastewater can be further reduced.

This is followed preferably by at least one coagulation and at least one flocculation. In this case, solids suspended in the wastewater are preferably aggregated into larger particles and removed by flocculation. In the flocculating step, chemicals are added to the wastewater that promote the flocculation of the particles coagulated beforehand; examples of such chemicals are organic or inorganic polymers. In these steps, iron ions present in the wastewater are also removed by precipitation.

This is preferably followed by at least one sedimentation, in which the particles that have flocculated out settle at the bottom of the suspension and can be removed continuously or discontinuously. The sludge separated off in this way can be pressed, dried, and then sent for waste reutilization.

This is preferably followed by at least one filtration. In this case the aqueous phase of the wastewater thus treated is filtered via one or more stages. This is followed preferably by at least one ultrafiltration, in which specific membranes separate particles in the range from 0.1 to 0.001 µm—for example, high-molecular substances, colloidal substances, polymeric substances—from the aqueous phase.

This is followed preferably by at least one reverse osmosis. Here, ions or larger molecules are retained on semi-permeable membranes, so that only water in near-pure form passes through the semi-permeable membrane. In the process of the invention, the reverse osmosis separates preferably salts from the wastewater, for example phosphates, chlorides and/or sulphates, which after the reverse osmosis are located in the salt-enriched wastewater. In one preferred embodiment, if step c) and/or step d) are/is carried out using sulphate salts, the salt-enriched wastewater is returned to step c) and/or step d). This has the advantage that the sulphate present in the process is largely re-used and there is no need to introduce sulphate as an external raw material into the process.

The wastewater cleaned in step h) of the process of the invention can be re-used for chemical operations in the reactors or for other steps, for example as wash water for filtration operations. As an alternative to wastewater cleaning, the wastewater from step d), containing the stated ammonium compounds, nitrite compounds and nitrate compounds, can be used, alone or in a mixture, as fertilizer, optionally with other suitable components and/or after concentration by reverse osmosis or evaporation.

In a further preferred embodiment of the process of the invention, in step j), the heated precleaned gas stream obtained after step g), with temperatures typically of 200 to 1400° C., preferably of 250 to 500° C., if step g) has been carried out in the presence of at least one catalyst, or preferably of 800 to 1400° C., if step g) has been carried out in the absence of a catalyst, is utilized to preheat the precleaned gas stream from step f).

The invention further encompasses apparatus suitable for implementing the process of the invention. This apparatus is elucidated in more detail below, using the figures.

Figure 2:
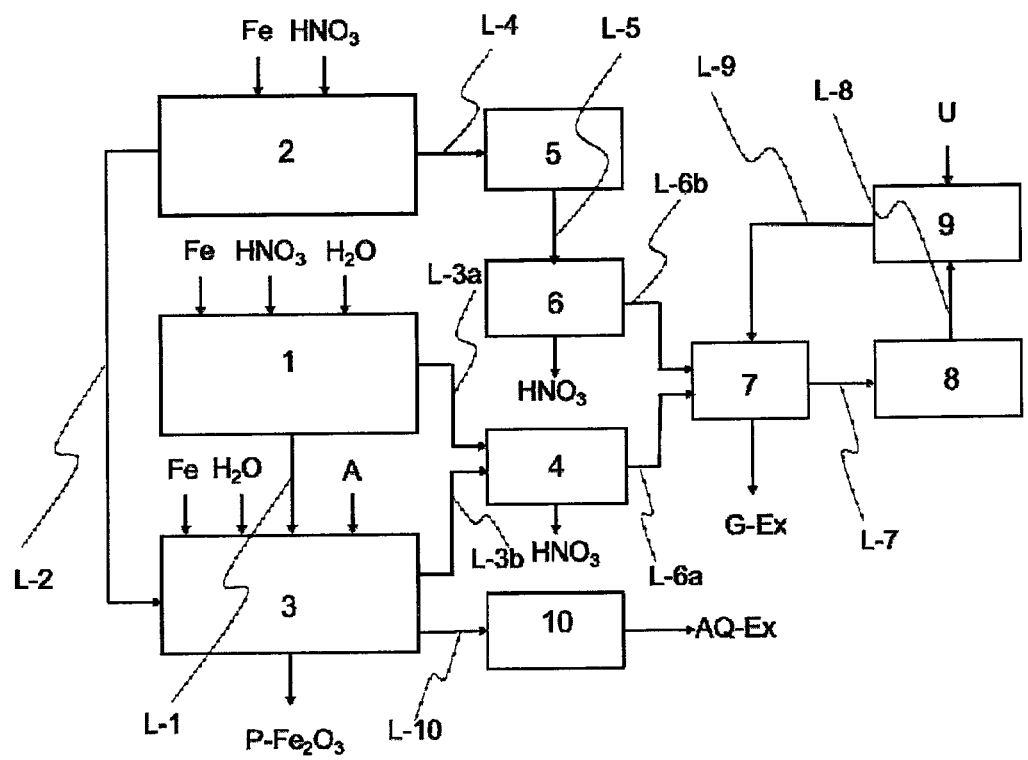
FIG. 2 shows the representation of an inventive apparatus which in comparison to FIG. 1 additionally has a further scrubber, a heat exchanger and a wastewater cleaning unit.
Figure 2A:
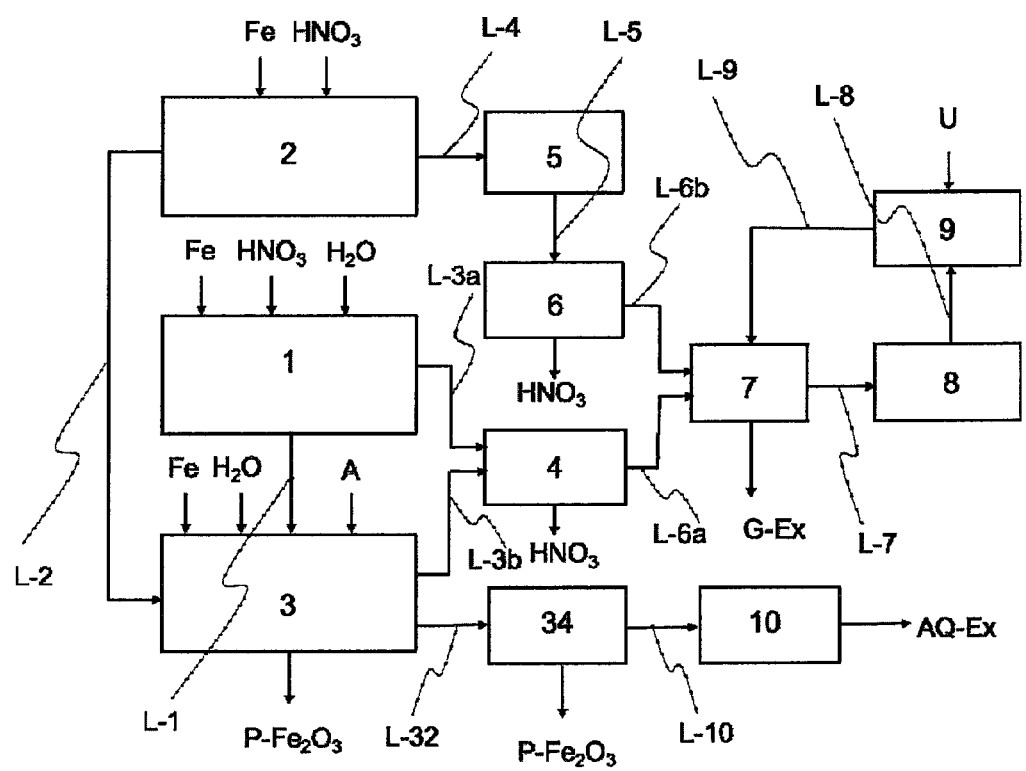

FIG. 2a shows the representation of an inventive apparatus which in contradistinction to FIG. 2 has a separate isolating means 34 between reactor 3 and wastewater cleaning unit 10.

Figure 3:
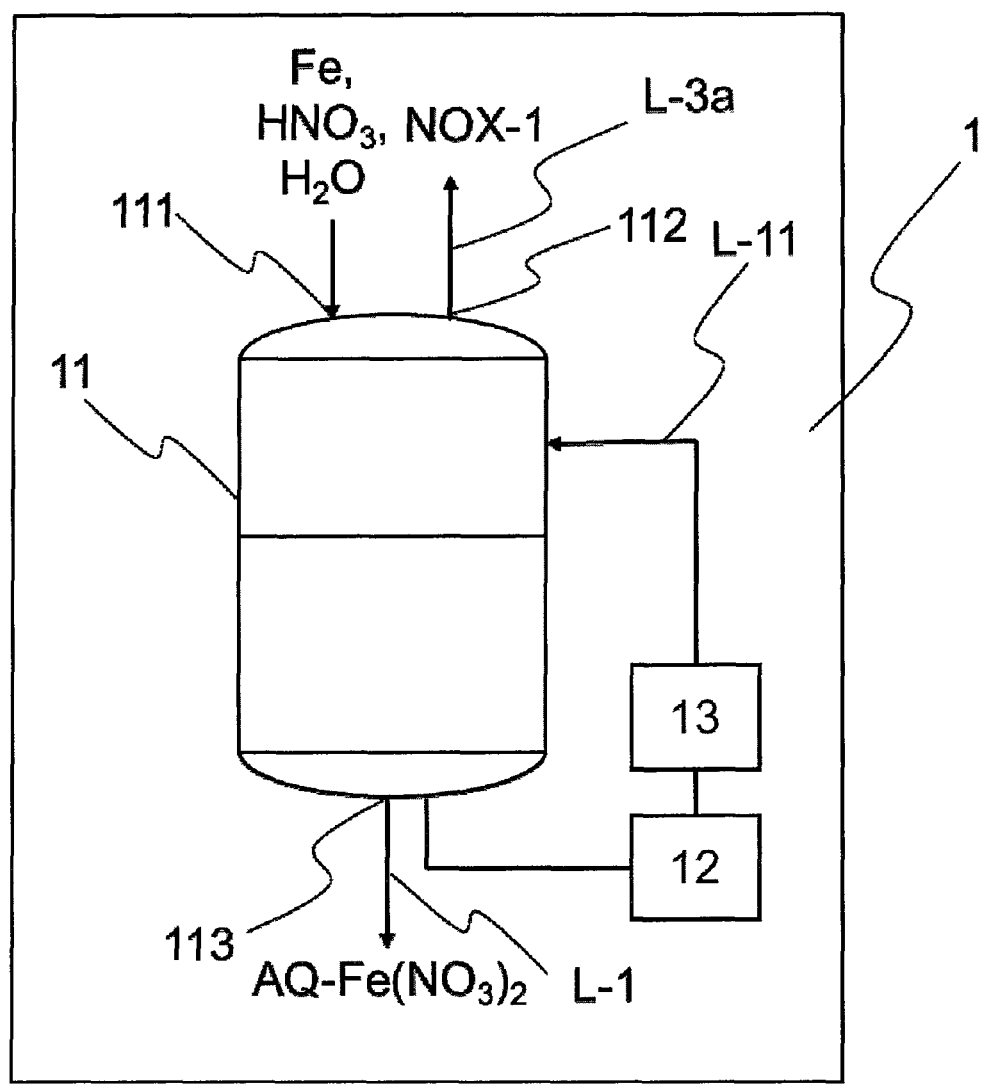
Figure 4:
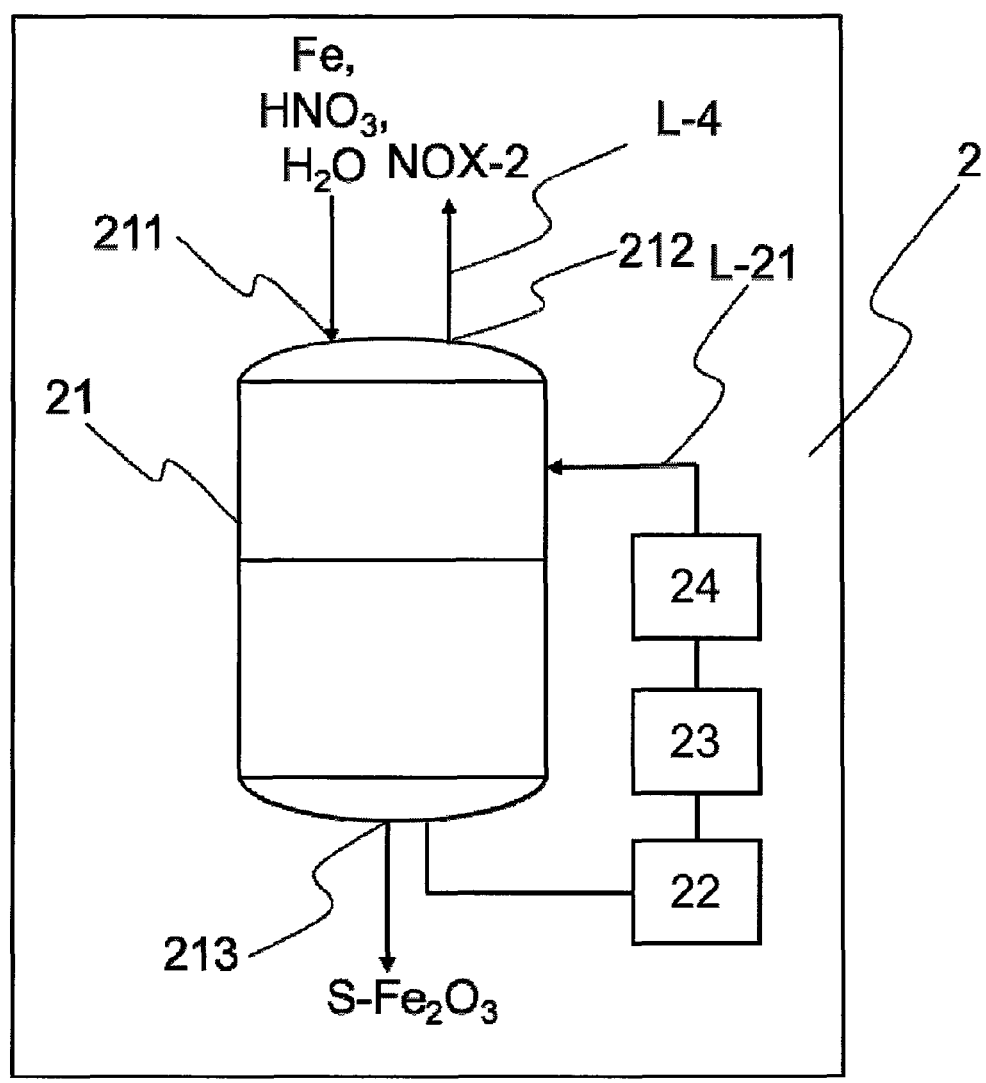
Figure 5:
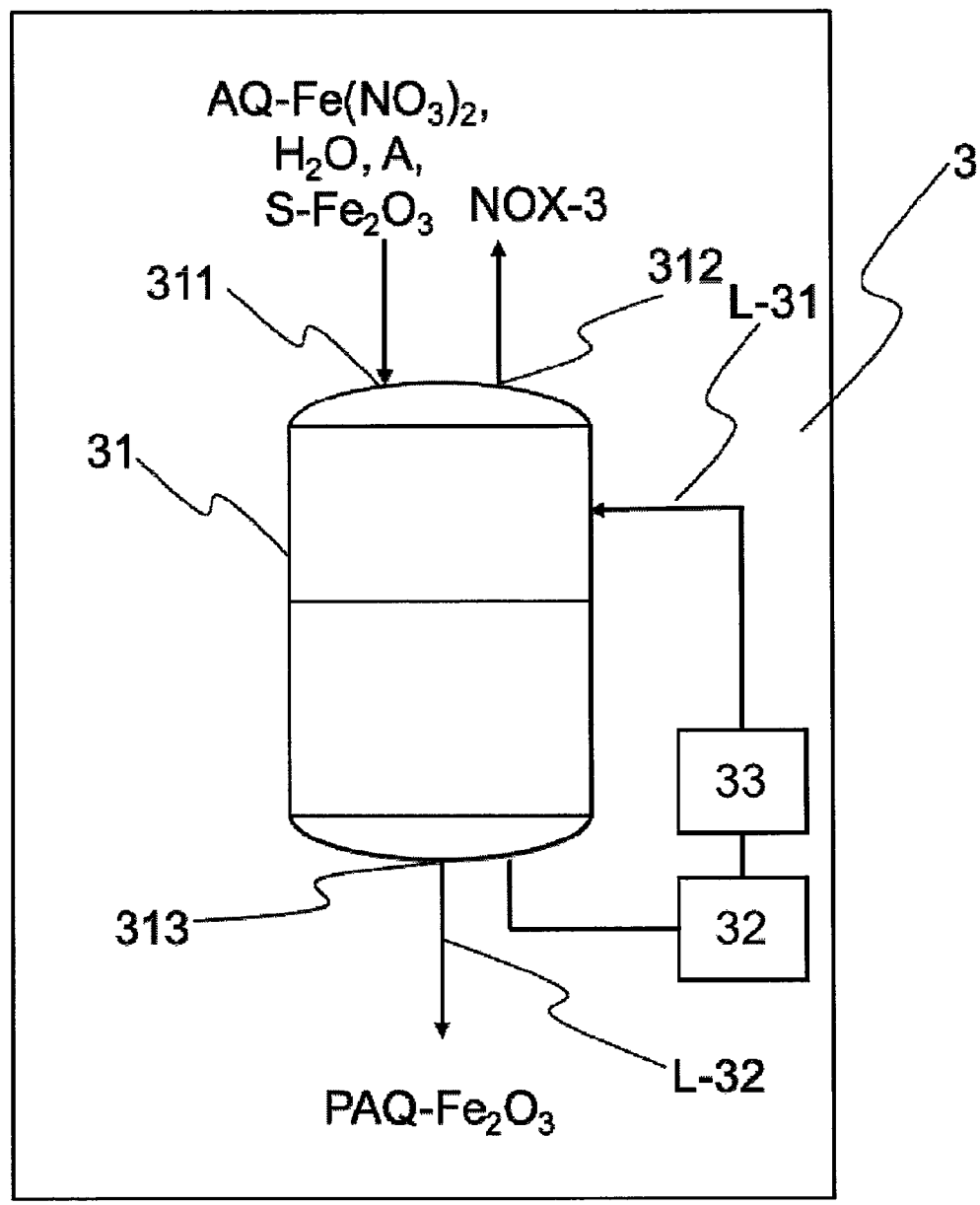
Figure 6:
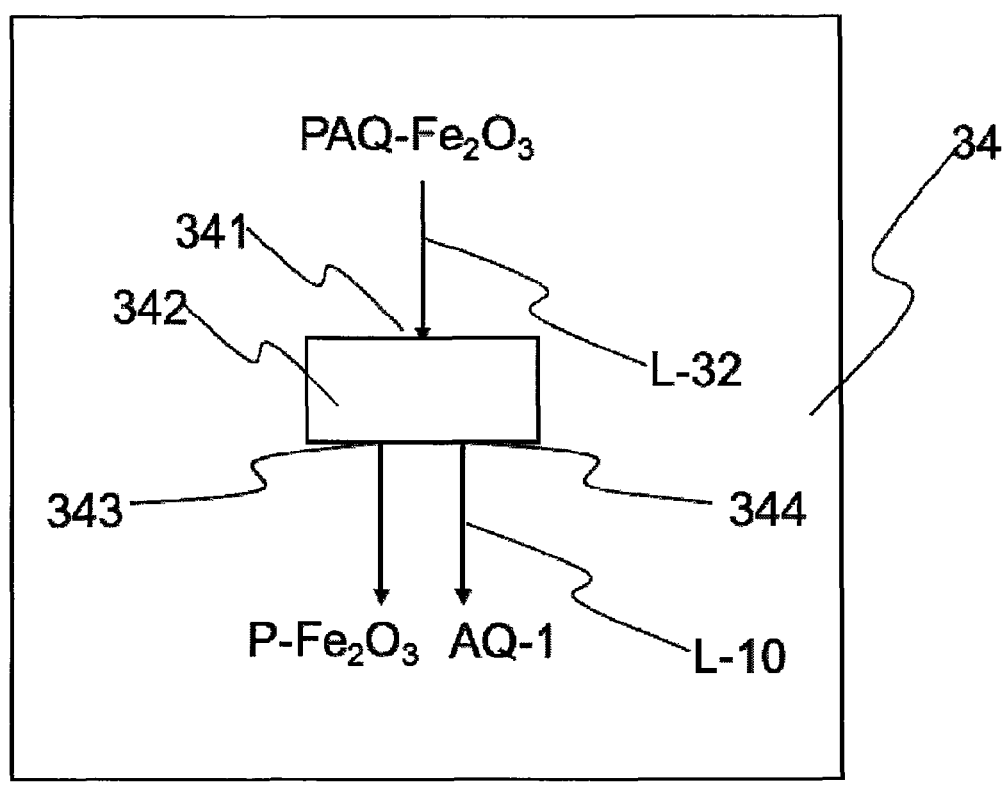

FIG. 3 shows an exemplary embodiment of a reactor 1.
FIG. 4 shows an exemplary embodiment of a reactor 2.
FIG. 5 shows an exemplary embodiment of a reactor 3.
FIG. 6 shows an exemplary embodiment of an isolating means 34.

Figure 7:
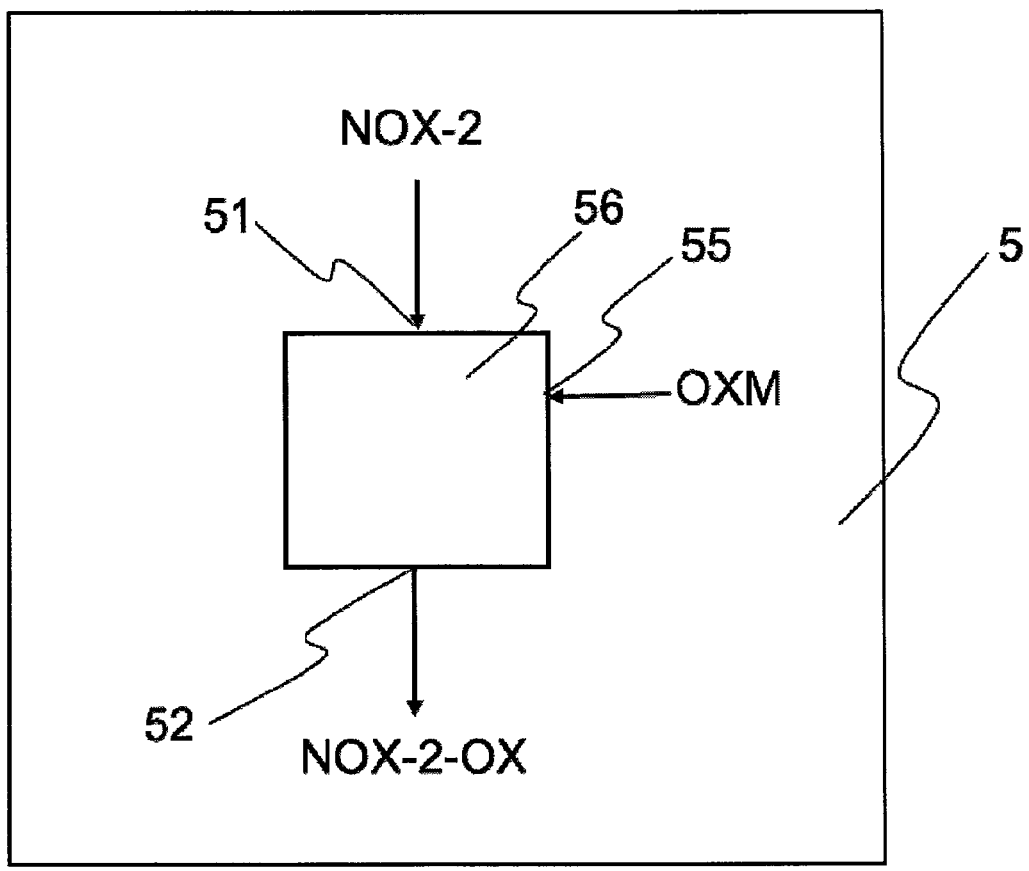
Figure 7A:
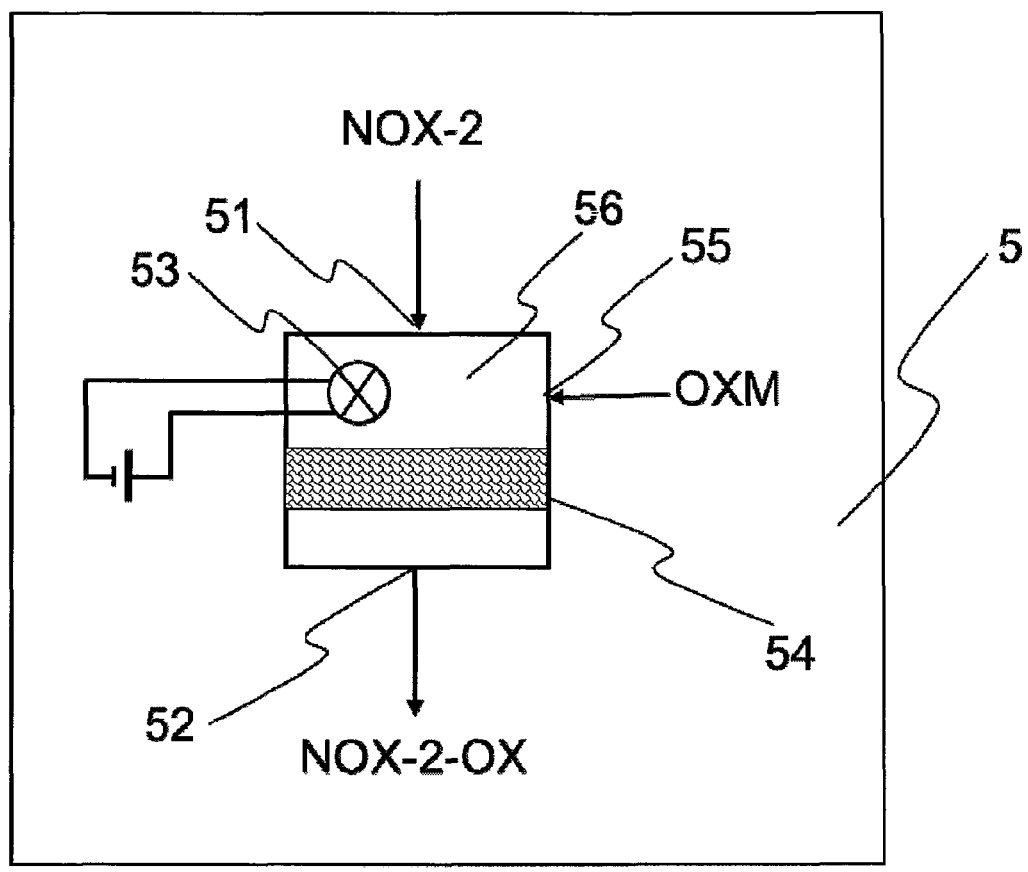
Figure 8:
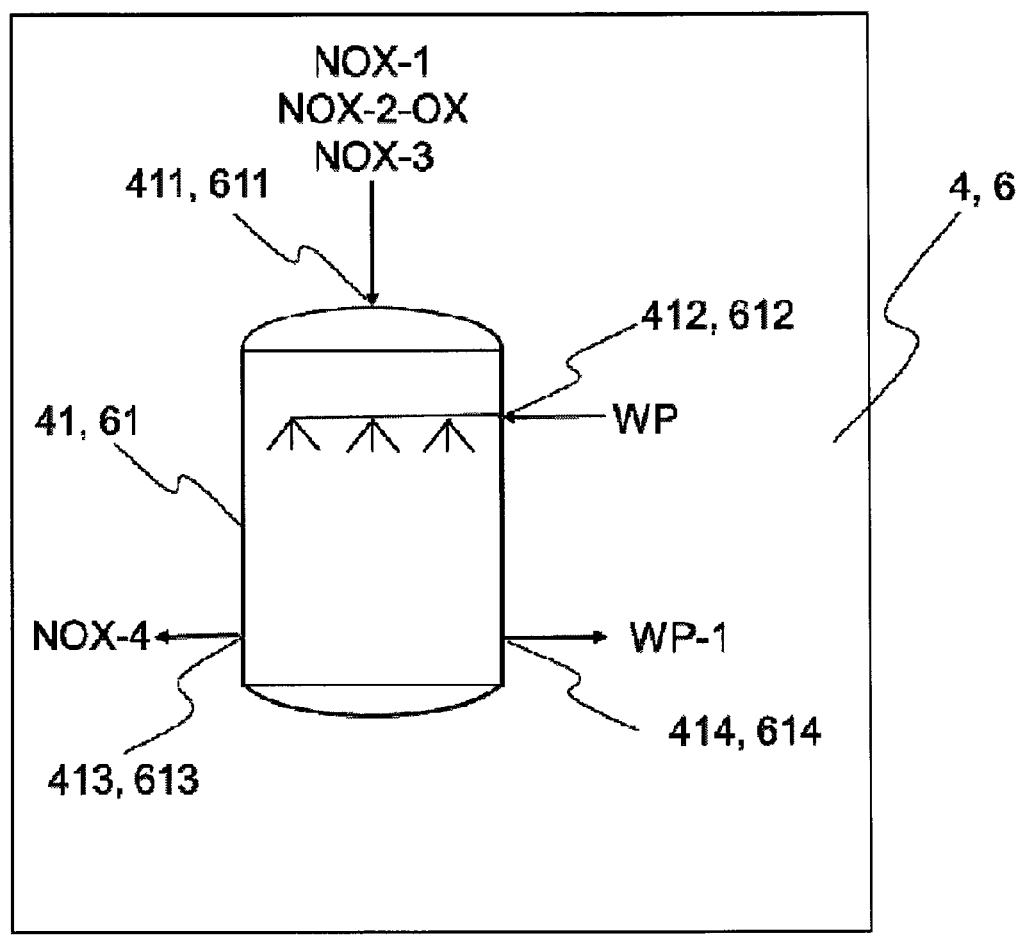
Figure 8A:
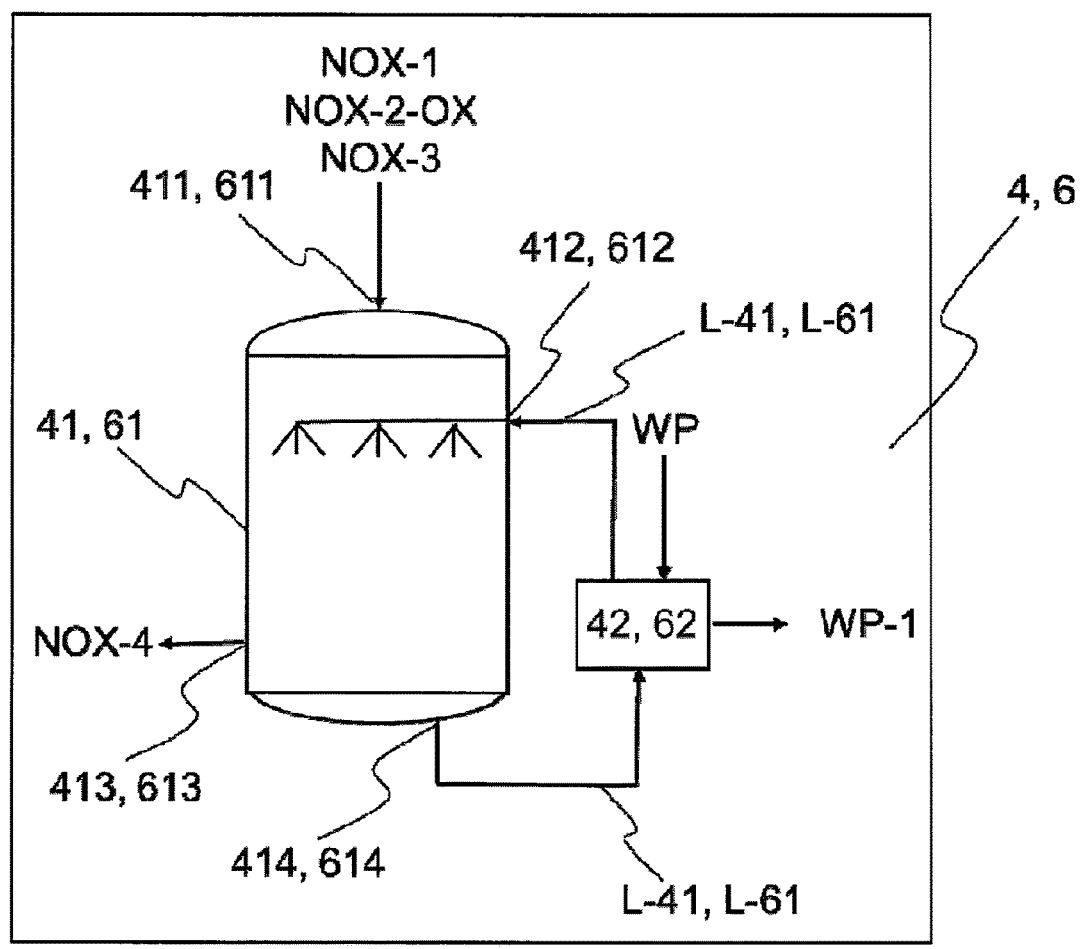
Figure 9:
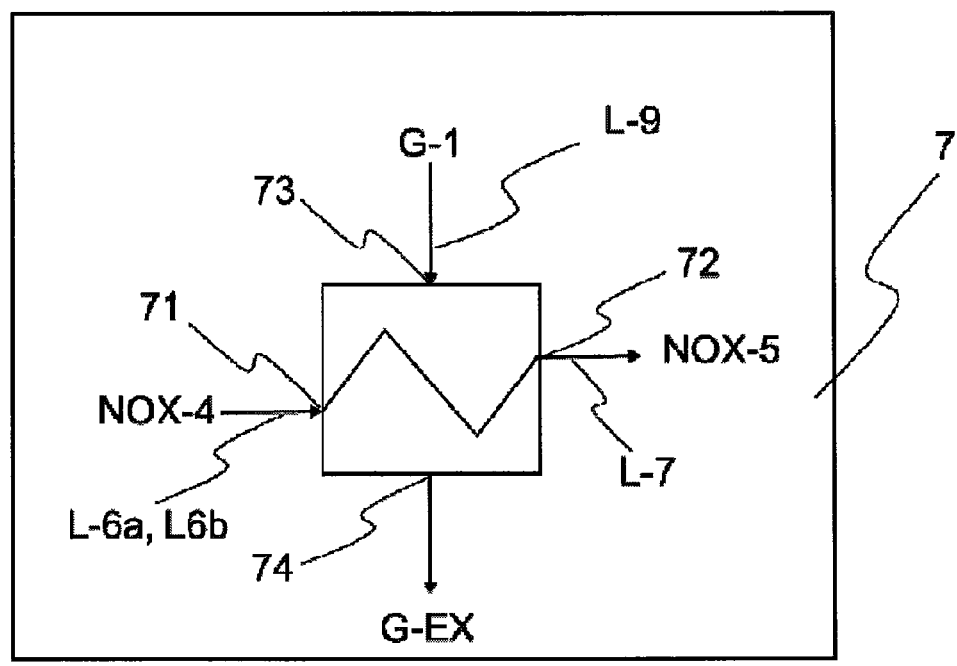
Figure 10:
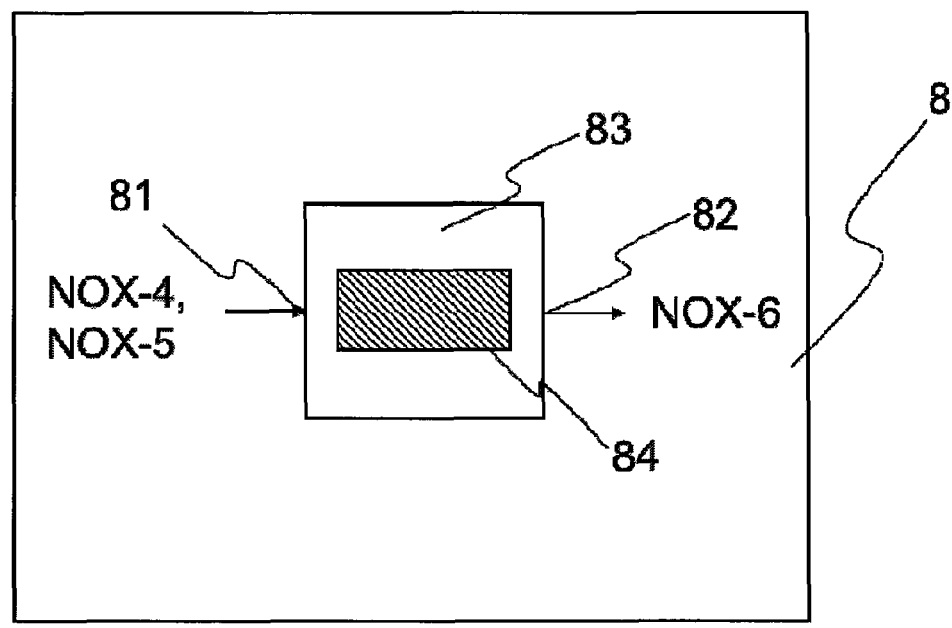
Figure 11:
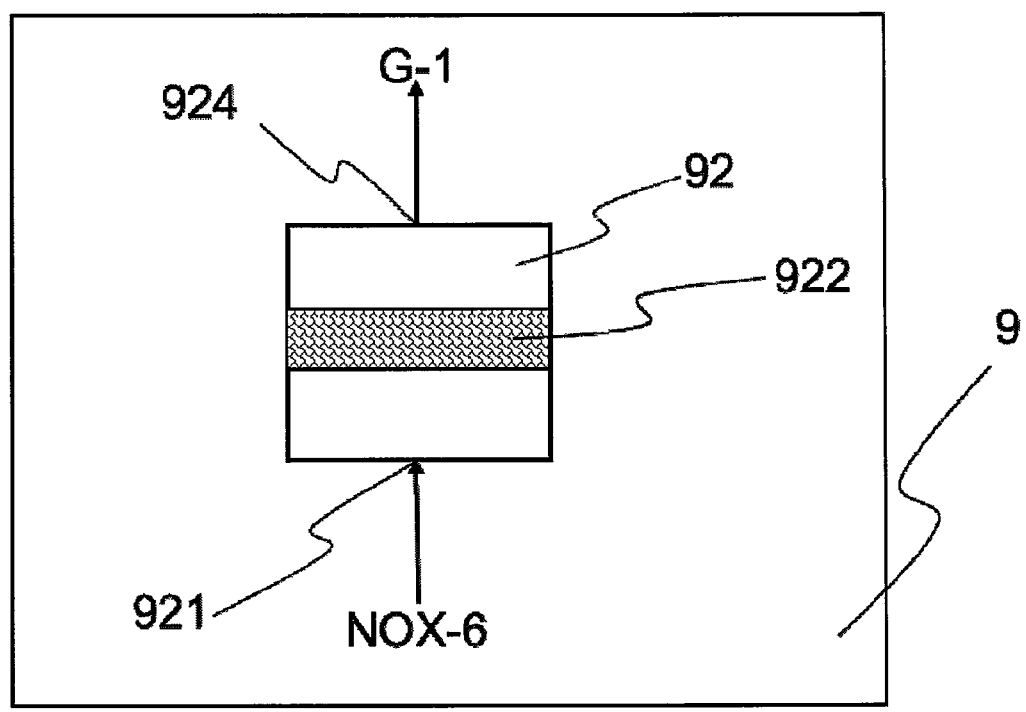
Figure 11A:
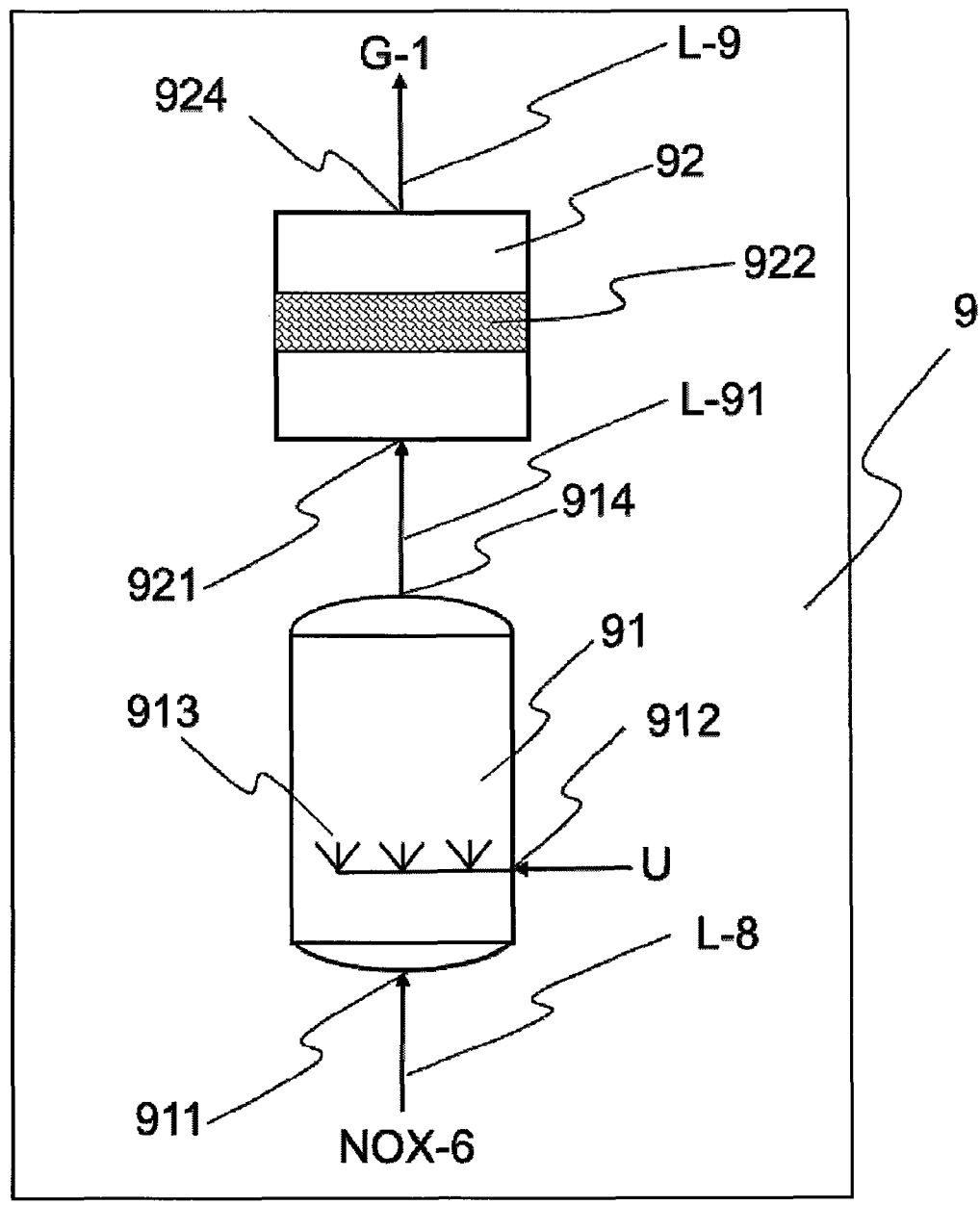
Figure 11B:
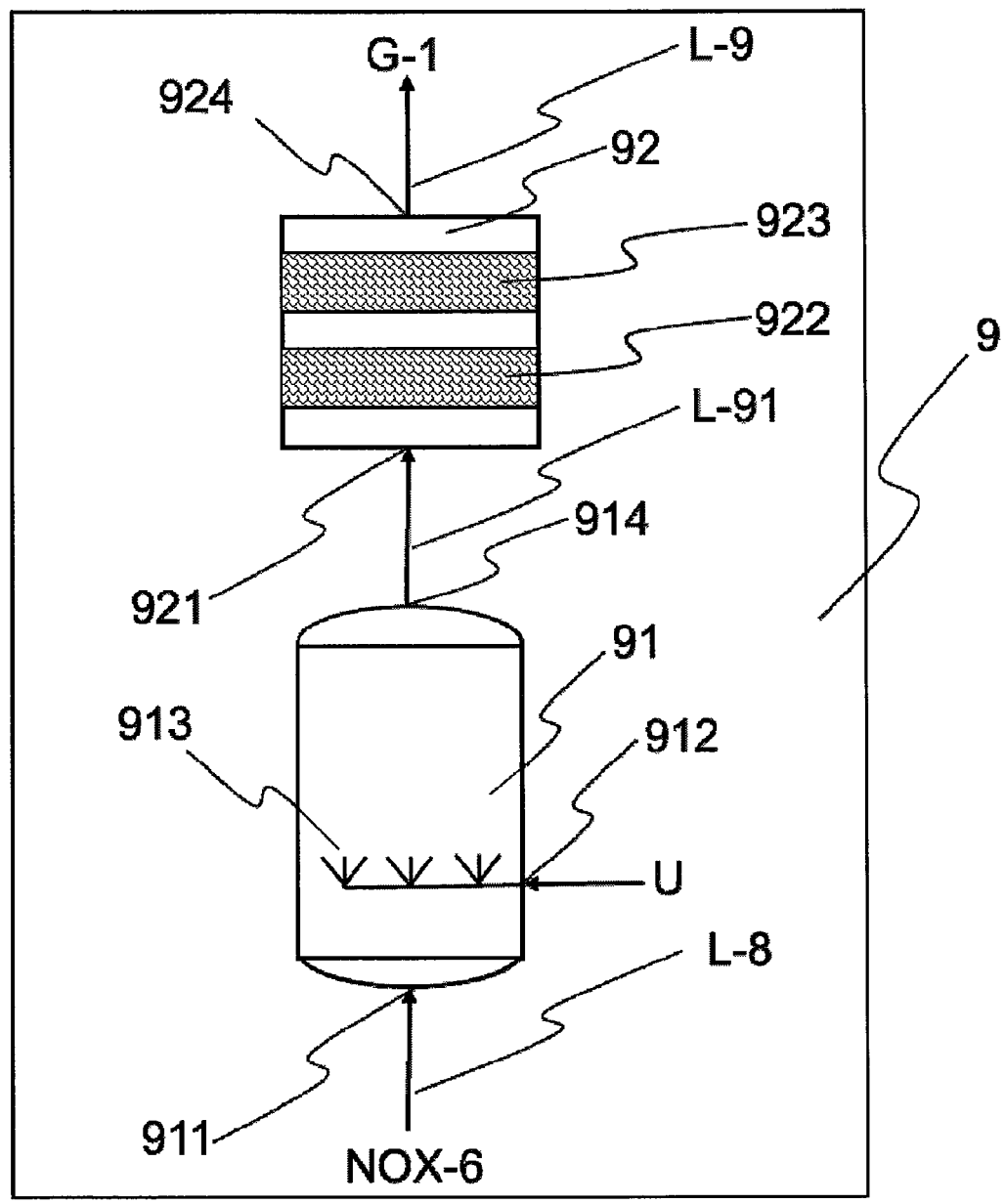
Figure 12:
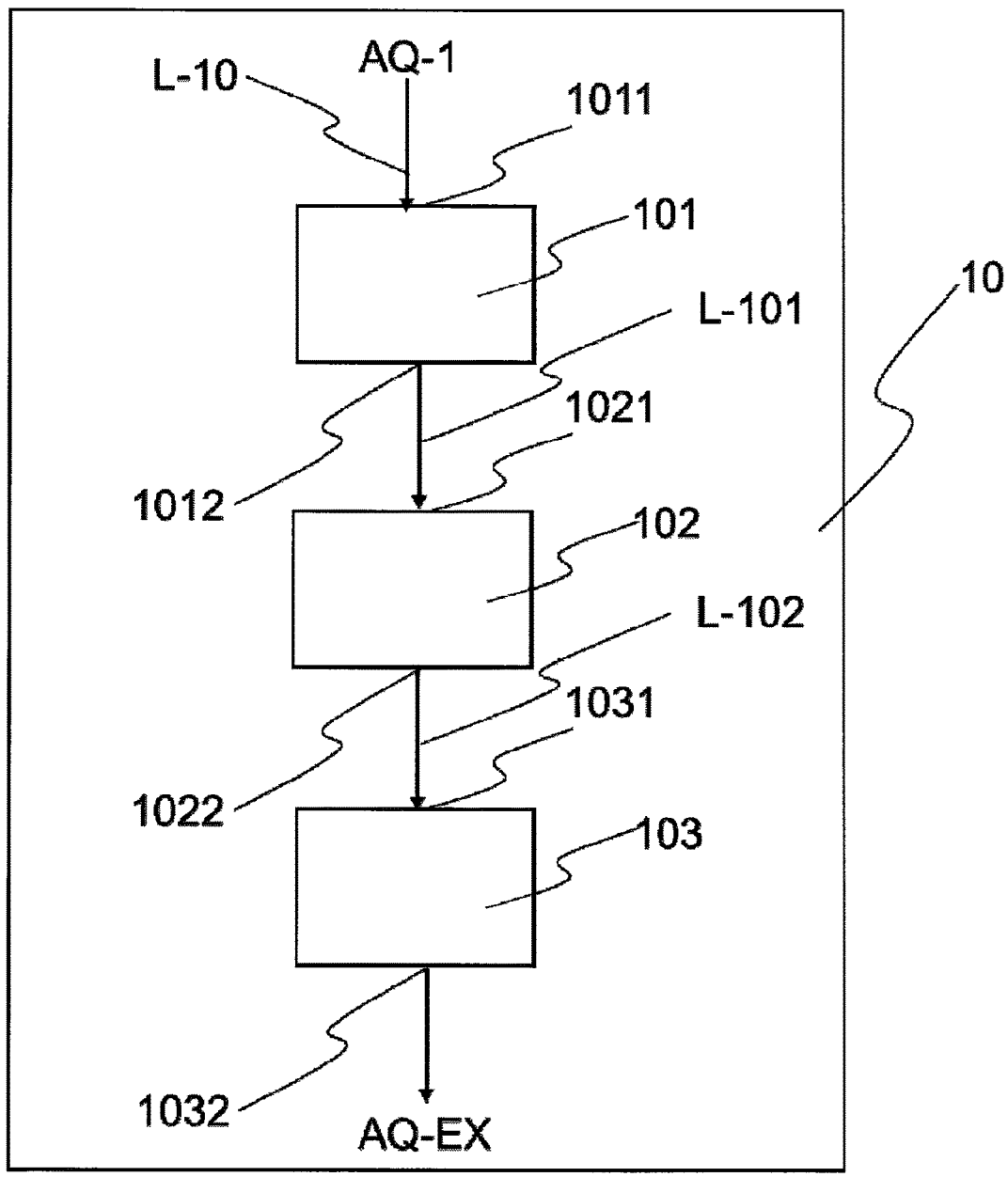

FIGS. 7 and 7a show exemplary embodiments of an oxidizing unit 5.
FIGS. 8 and 8a show exemplary embodiments of a scrubber 4 or 6.
FIG. 9 shows an exemplary embodiment of a heat exchanger 7.
FIG. 10 shows an exemplary embodiment of a heater 8.
FIGS. 11, 11a and 11b show exemplary embodiments of a waste gas cleaning unit 9.
FIG. 12 shows an exemplary embodiment of a wastewater cleaning unit 10.

DESIGNATIONS IN THE FIGURES ARE AS FOLLOWS

A oxygen-containing gas
AQ-1 wastewater from the preparation of the haematite pigment suspension
AQ-2 cleaned wastewater obtained from the biological denitrification of the wastewater AQ-1
AQ-3 cleaned wastewater obtained after coagulation, flocculation and/or sedimentation of the wastewater AQ-2
AQ-4 salt-enriched wastewater
AQ-EX cleaned wastewater
Fe iron
AQ-Fe(NO$_3$)$_2$ iron(II) nitrate solution
P-Fe$_2$O$_3$ pigment
S-Fe$_2$O$_3$ haematite nucleus suspension
PAQ-Fe$_2$O$_3$ haematite pigment suspension G-1 cleaned waste gas
G-EX cooled cleaned waste gas
H$_2$O water
HNO$_3$ nitric acid
L-1 to L-x lines 1 to x
NOX-1 first nitrogen oxide-containing stream (waste gas from the preparation of the iron(II) nitrate solution)
NOX-2 second nitrogen oxide-containing stream (waste gas from the preparation of haematite nucleus suspension)
NOX-2-OX oxidized second nitrogen oxide-containing stream (oxidized waste gas from the preparation of the haematite nucleus suspension)
NOX-3 third nitrogen oxide-containing stream (waste gas from the preparation of the haematite pigment suspension)
NOX-4 precleaned gas stream (waste gas resulting from scrubbing of NOX-1, NOX-2-OX and NOX-3)
NOX-5 preheated precleaned gas stream (waste gas resulting from preheating of NOX-4)
NOX-6 heated precleaned gas stream (waste gas resulting from heating of NOX-4 or NOX-5)
NOX-7 NOX-6 enriched with U
OXM oxidizing agent
U ammonia or urea
WP aqueous wash phase
WP-1 HNO$_3$-enriched wash phase WP
1 reactor for preparing iron(II) nitrate solution
11 reaction vessel
12 mixer
13 cooling unit
111 inlet for iron, HNO$_3$ and H$_2$O
112 outlet for NOX-1
113 outlet for iron(II) nitrate solution
2 reactor for preparing haematite nucleus suspension
21 reaction vessel
22 mixer
23 cooling unit
24 heater 211 inlet for iron, HNO₃ and H₂O
212 outlet for NOX-2
213 outlet for haematite nucleus suspension
3 reactor for preparing haematite pigment suspension
31 reaction vessel
32 mixer
33 heater
34 isolating means
311 inlet for iron(II) nitrate solution, haematite nucleus suspension, oxygen-containing gas and water
312 outlet for NOX-3
313 outlet for haematite pigment suspension
341 inlet for haematite pigment suspension
342 isolating assembly
343 outlet for haematite pigment
344 outlet for wastewater AQ-1
4 scrubber
41 scrubbing column
42 valve
411 inlet for NOX-1, NOX-3 and/or NOX-2-OX
412 inlet for aqueous wash phase WP
413 outlet for NOX-4
414 outlet for HNO₃-enriched wash phase WP-1
5 oxidizing unit
51 inlet for NOX-2
52 outlet for NOX-2-OX
53 irradiating unit
54 oxidation catalyst
55 inlet for oxidizing agent
56 oxidizing vessel
6 scrubber
61 scrubbing column
62 valve
611 NOX-1, NOX-3 and/or NOX-2-OX
612 inlet for aqueous wash phase WP
613 outlet for NOX-4
614 outlet for HNO₃-enriched wash phase WP-1
7 heat exchanger
71 inlet for NOX-4
72 outlet for NOX-5
73 inlet for G-1
74 outlet for G-EX
8 heater
81 inlet for NOX-4 or NOX-5
82 outlet for NOX-6
83 heating chamber
84 heating element
9 waste gas cleaning unit
91 evaporator
92 reactor
911 inlet for NOX-6
912 inlet for U
913 liquid distributor
914 outlet for NOX-7
921 inlet for NOX-6 or NOX-7
922 catalyst
923 catalyst
924 outlet for G-1
10 wastewater cleaning unit
101 unit for biological denitrification
102 unit for coagulation/flocculation/sedimentation
103 unit for filtration/ultrafiltration/reverse osmosis
1011 inlet for AQ-1
1012 outlet for AQ-2
1021 inlet for AQ-2
1022 outlet for AQ-3
1031 inlet for AQ-3
1032 outlet for AQ-EX One embodiment of the apparatus of the invention comprises at least
  at least one reactor (1), and
  at least one reactor (2), at least one reactor (3),
  at least one scrubber (4), preferably two scrubbers (4 and 6), where
    (a) the at least one reactor (1) communicates via at least one line (L-3a) with the at least one scrubber (4) or (6), and
    (b) the at least one reactor (3) communicates via at least one line (L-3b) with the at least one scrubber (4) or (6), and
    (c) the at least one reactor (2) communicates via at least one line (L-4) with at least one oxidizing unit (5), and the at least one oxidizing unit (5) communicates via at least one line (L-5) with the at least one scrubber (4) or (6), and
  at least one waste gas cleaning unit (9), and at least one heater (8), the at least one waste gas cleaning unit (9) communicating via at least one line (L-8) with at least one heater (8), and the at least one heater (8) communicating via at least one line (L-7) with the at least one scrubber (4) or (6).

Additionally to the apparatus described above, one alternative embodiment of the apparatus of the invention comprises at least one wastewater cleaning unit (10) which communicates via at least one line (L-10) with at least one reactor (3) or with at least one isolating means (34).

Additionally to one of the above-described apparatus, one alternative embodiment of the apparatus of the invention comprises at least one heat exchanger (7), preferably a heat exchanger (7) which communicates via at least one line (L-6a) with the at least one scrubber (4), via at least one line (L-6b) with the at least one scrubber (6), via at least one line (L-7) with the at least one heater (8) and via at least one line (L-9) with the at least one waste gas cleaning unit (9).

Additionally to one of the above-described apparatus, one alternative embodiment of the apparatus of the invention comprises at least one isolating means (34), preferably a filtering means (34), which communicates via at least one line (L-10) with at least one wastewater cleaning unit (10) and via at least one line (L-32) with at least one reactor (3).

Described in detail below are the individual apparatuses and the process steps carried out therein.

It may be noted at this point that the scope of the invention encompasses all desired and possible combinations of the embodiments of the apparatus that are given below, including the preference ranges thereof, in combination with any combination of the above process of the invention and preferred embodiments thereof.

In the at least one reactor 1, in step a), an iron(II) nitrate solution is prepared by reaction of iron with nitric acid, producing a first nitrogen oxide-containing stream.

As at least one reactor 1 it is possible to use reactors of the kind well known to the skilled person for such types of reaction. Reactors 1 for the reaction of iron with nitric acid to give aqueous iron(II) nitrate solution typically comprise reaction vessels made from materials which are resistant to the iron and nitric acid feedstocks and also to the iron nitrate and nitrogen oxides reaction products. Simple reactors may be, for example, vessels that are walled or tiled and are set into the earth. The reactors also encompass, for example, reaction vessels made of glass, of nitric acid-resistant plastics, such as polytetrafluoroethylene (PTFE), for example, of steel, enamelled steel, plastic-coated or varnish-coated steel, and stainless steel with the material number 1.44.01, for example. The reaction vessels are preferably vessels made from stainless steel, enamelled steel, more preferably from stainless steel with the material number 1.44.01. The reaction vessels may be open or closed. In preferred embodiments of the invention, the reaction vessels are closed. The reaction vessels are typically designed for temperatures between 0 and 150° C. and for pressures from 0.05 MPa (0.05 megapascal corresponds to 0.5 bar) to 1.5 MPa (1.5 megapascals correspond to 15 bar).

One preferred embodiment of a reactor 1 is shown in FIG. 3. Reactor 1 has at least reaction vessel 11, mixer 12, cooling unit 13, inlet 111 for $HNO_3$ and iron, outlet 112 for the first nitrogen oxide-containing stream NOX-1, and outlet 113 for the iron(II) nitrate solution AQ-Fe($NO_3$)$_2$. In one alternative embodiment, inlet 111 and/or outlet 112 and/or outlet 113 in the reaction vessel 11 may also be designed such that they are realized by the same opening, by one inlet for each individual reactant and/or product, or by any desired combination thereof. In the preferred embodiment according to FIG. 3, mixer 12 and cooling unit 13 communicate via a line L-11, in which the iron(II) nitrate solution circulates, with the reaction vessel 11. In another preferred embodiment, the mixer 12 may also take the form of a mechanical mixer, for example a propeller mixer in the reaction vessel 11. In a further preferred embodiment, the cooling unit 13 may be realized directly in the reaction vessel 11, for example as a cooling jacket, or as a cooling coil.

Described in the text below is the implementation of step a) of the process of the invention, by way of example in a reactor 1. To carry out step a) of the process of the invention, the iron, water and $HNO_3$ feedstocks are introduced into the reaction vessel 11 via the inlet 111. When the liquid phase is contacted with the iron, an exothermic reaction begins. Typically, iron and water are charged to the reactor. The nitric acid may be added rapidly, if the exothermic reaction allows, or over a period of up to 10 hours. The reaction temperature here is held at or less than 60° C. by means of the cooling means 13. At the same time the liquid phase is mixed by means of the mixer 12, producing a uniform distribution of the liquid phase around the iron. The mixer 12 serves to generate turbulences in the liquid phase of the reaction mixture, and is typically a pump, which conveys the iron(II) nitrate solution AQ-Fe($NO_3$)$_2$ in circulation, or a mechanical stirrer, which mixes the liquid phase with a propeller, for example. The degree of conversion is determined by the amount of $HNO_3$ in relation to the iron. The iron(II) nitrate solution AQ-Fe($NO_3$)$_2$ thus prepared is either stored temporarily in an optional storage or sedimentation vessel (not shown in FIG. 1 or 2) and/or transported directly into at least one reactor 3, preferably via a line L-1 that communicates with inlet 311.

In the reactor 2, in step b), an aqueous haematite nucleus suspension is prepared by reaction of iron with nitric acid, producing a second nitrogen oxide-containing stream.

As at least one reactor 2 it is possible to use reactors of the kind well known to the skilled person for such types of reaction. The reactors 2 typically comprise one or more reaction vessels made of materials which are resistant towards the feedstocks. Simple reaction vessels may be containers which are walled or tiled, for example, and are let into the earth. The reactors are for example also vessels made from glass, nitric acid-resistant plastics, such as polytetrafluoroethylene (PTFE), for example, steel, for example enamelled steel, plastic-coated or varnish-coated steel, or stainless steel with the material number 1.44.01, for example. The reaction vessels may be open or closed. In preferred embodiments of the invention the reaction vessels are closed. The reaction vessels are designed typically for temperatures between 0 and 150° C. and for pressures of 0.05 MPa (0.05 megapascal corresponds to 0.5 bar) to 1.5 MPa (1.5 megapascals correspond to 15 bar).

One preferred embodiment of a reactor 2 is shown in FIG. 4. Reactor 2 has at least reaction vessel 21, mixer 22, cooling unit 23, heater 24, inlet 211 for Fe and $HNO_3$, outlet 212 for a second nitrogen oxide-containing stream NOX-2, and also outlet 213 for the haematite nucleus suspension S-$Fe_2O_3$. In one alternative embodiment, inlet 211 and/or outlet 212 and/or outlet 213 may also be designed such that they are realized by the same opening, by one inlet or outlet for each individual reactant or product, or by any desired combination thereof. In the preferred embodiment according to FIG. 4, mixer 22, cooling unit 23 and heater 24 communicate via a line L-21, in which the haematite nucleus suspension circulates, with the reaction vessel 21. In a further preferred embodiment, the mixer 22 may also be realized in the form of a mechanical mixer, for example as propeller mixer in the reaction vessel 11. In a further preferred embodiment, the cooling unit 23 and/or the heater 24 may be realized directly in the reaction vessel 11, for example as a cooling jacket and/or heating jacket, or by direct steam introduction or as a cooling cartridge or heating cartridge, or by direct introduction of cold or hot water. Described hereinafter is the implementation of step b) of the process of the invention by way of example in a reactor 2. To carry out step b) of the process of the invention, the iron, water and $HNO_3$ feedstocks are introduced into the reaction vessel 21 via the inlet 211. The reaction here is carried out as observed above under step b). By means of the heater 24, the reaction mixture consisting of iron and water is heated to the required reaction temperature (in this regard, see the observations under step b) of the process of the invention). When the desired starting temperature has been reached, $HNO_3$ is added in the manner described under step b), initiating an exothermic reaction which causes a further increase in the temperature of the reaction mixture. In another preferred embodiment, at the same time, the liquid phase is mixed by means of the mixer 22, producing a uniform distribution of the liquid phase around the iron. The mixer 22 serves to generate turbulences in the liquid phase of the reaction mixture, and is typically a pump which conveys the haematite nucleus suspension S-($Fe_2O_3$) in circulation, or a mechanical stirrer, which mixes the liquid phase with a propeller, for example. The degree of conversion is determined by the amount of $HNO_3$ in relation to the iron, and by the temperature profile during the reaction. During the course of the reaction, there is a steady decrease in the concentration of $HNO_3$. The haematite nucleus suspension S-($Fe_2O_3$) thus prepared is either stored temporarily in an optional storage or sedimentation vessel (not shown in FIG. 1, 2 or 4), via the outlet 213, and/or transported directly via the outlet 213 into the reactor 3, preferably via a line L-2 that communicates with inlet 311. Unreacted iron remains in the reaction vessel 21 until the next reaction, when water and fresh iron are added again.

In the at least one reactor 3, in step c), an aqueous haematite pigment suspension is prepared by
  I. reaction of the aqueous haematite nucleus suspension from step b) with the iron(II) nitrate solution from step a) and at least one alkaline precipitant in the presence of at least one oxygen-containing gas, or by
  II. reaction of the aqueous haematite nucleus suspension from step b) with the iron(II) nitrate solution from step a), and iron and at least one oxygen-containing gas, producing a third nitrogen oxide-containing stream.

As at least one reactor 3 it is possible to use reactors of the kind well known to the skilled person for such types of reaction. The reactors 3 typically comprise one or more reaction vessels made of materials which are resistant towards the feedstocks. Simple reaction vessels may be containers which are walled or tiled, for example, and are let into the earth. The reactors are for example also vessels made from glass, nitric acid-resistant plastics, such as polytetrafluoroethylene (PTFE), for example, steel, for example enamelled steel, plastic-coated or varnish-coated steel, or stainless steel with the material number 1.44.01, for example. The reaction vessels may be open or closed. In preferred embodiments of the invention the reaction vessels are closed. The reaction vessels are designed typically for temperatures between 0 and 150° C. and for pressures of 0.05 MPa (0.05 megapascal corresponds to 0.5 bar) to 1.5 MPa (1.5 megapascals correspond to 15 bar).

One preferred embodiment of a reactor 3 is shown in FIG. 5. Reactor 3 has at least reaction vessel 31, mixer 32, heater 33, inlet 311 for iron(II) nitrate solution, haematite nucleus suspension, oxygen-containing gas and water, outlet 312 for the third nitrogen oxide-containing stream NOX-3, and outlet 313 for the haematite pigment suspension. In one alternative embodiment, inlet 311 and/or outlet 312 and/or outlet 313 in the reaction vessel 311 may also be designed such that they are realized by the same opening, by one inlet or outlet for each individual reactant and/or product, or by any desired combination thereof. In the preferred embodiment according to FIG. 5, mixer 32 and heater 33 communicate via a line L-31, in which the haematite pigment suspension circulates, with the reaction vessel 31. In another preferred embodiment, the mixer 32 may also take the form of a mechanical mixer, for example a propeller mixer in the reaction vessel 31. In a further preferred embodiment, the heater 33 may be realized directly in the reaction vessel 31, for example as a heating jacket, heating cartridge and/or heating coil, or by direct vapour introduction by direct admission of hot water.

Described below is the implementation of step c) of the process of the invention by way of example in a reactor 3. To carry out step c) of the process of the invention, in the "acidic precipitation" embodiment, the iron, water, iron(II) nitrate solution and haematite nucleus suspension feedstocks are introduced into the reaction vessel 31 via the inlet 311. The heater 33 heats the reaction mixture to a temperature of 70 to 100° C., preferably 75 to 90° C. (in this regard see the observations under step c) of the process of the invention). At the same time, by oxidation with 0.2 to 50 l of air per hour and per liter of suspension, haematite is precipitated on to the haematite nucleus, and enlarges during the reaction, until the red iron oxide pigment has reached the desired color shade ("acidic precipitation" embodiment). In another preferred embodiment, at the same time, the liquid phase is mixed by means of the mixer 32, producing a uniform distribution of the liquid phase, which as the reaction progresses increasingly, comprises suspended haematite pigments, around the iron. The mixer 32 serves to generate turbulences in the liquid phase of the reaction mixture and is typically a pump, which conveys the haematite pigment suspension PAQ-Fe$_2$O$_3$ in circulation, or a mechanical stirrer, which mixes the liquid phase with a propeller, for example. The haematite pigment suspension PAQ-Fe$_2$O$_3$ thus prepared is either stored temporarily in an optional storage vessel (not shown in FIG. 1, 2, 5 or 6) and/or transported directly via the outlet 313 via the line L-32, which communicates with inlet 341, into the isolating means 34.

In the at least one isolating means 34, in step d), the haematite pigment present in the aqueous haematite pigment suspension is isolated from the aqueous phase, preferably by filtration and/or sedimentation of the haematite pigment suspension and/or washing of the filtercake obtained by filtration and/or sedimentation.

As at least one isolating means 34 it is possible to use means of the kind sufficiently well known to the skilled person for such isolation steps. Isolating means 34 may be realized directly in the reactor 3 or as a separate facility. If isolating means 34 is realized as a separate facility, it communicates via a line L-32 with reactor 3 (see also FIG. 2a).

A preferred embodiment of an isolating means 34 is shown in FIG. 6. Isolating means 34 has at least inlet 341 for the haematite pigment suspension, isolating assembly 342, outlet 343 for haematite pigment, and outlet 344 for wastewater AQ-1. The contents of the wastewater AQ-1 include nitrate compounds, nitrite compounds and ammonium compounds, and this wastewater therefore typically has a total nitrogen content of 0.2 to 10 g/l nitrogen, preferably of 0.2 to 5 g/l nitrogen (calculated in each case on the basis of elemental nitrogen). In one alternative embodiment, inlet 341 and/or outlet 343 and/or outlet 344 in the isolating means 34 may also be designed such that they are realized by the same opening, by one inlet or outlet for each individual reactant and/or product, or by any desired combination thereof. In a further alternative embodiment, isolating means 34 may be integrated in the reactor 3; in this case, line L-10 communicates directly with reactor 3 (as also depicted in FIG. 2).

Described below is the implementation of step d) of the process of the invention by way of example in an isolating means 34.

To implement step d) of the process of the invention, the haematite pigment suspension is introduced by inlet 341 into the isolating assembly 342. In this assembly the solid constituents are separated from the liquid constituents. Prior to this it is possible optionally for one or more screening steps to be carried out, more preferably with different mesh sizes and with descending mesh sizes. The separation of the pigment from the liquid phase is accomplished, for example, by filtration. The liquid phase is separated off, and optionally the washing liquid obtained after the washing of the solid separated off, referred to jointly hereinafter as wastewater AQ-1, are transported via the outlet 344 to the wastewater cleaning unit 10 via the line L-10. The moist filtercake is withdrawn from the isolating assembly 342 via the outlet 343 and subsequently dried. In an alternative embodiment, the red iron oxide pigment is dried directly in the isolating assembly 342 and then removed in dried form from the outlet 343.

In the at least one oxidizing unit 5, in step e), the second nitrogen oxide-containing stream from step b) is oxidized.

As at least one oxidizing unit 5 it is possible to use oxidizing units of the kind sufficiently well known to the skilled person for such types of reaction.

The oxidizing unit 5 for oxidizing nitrogen oxides typically has pipelines or an oxidizing vessel in which a gas phase comprising a gas to be oxidized is brought into contact with an oxidizing agent, optionally with the use of one or more catalysts and/or of high-energy radiation, for example UV radiation, an inlet for a second nitrogen oxide-containing stream, an inlet for an oxidizing agent, an outlet for an oxidized second stream, optionally an energy source for high-energy radiation, for example a UV lamp, and/or optionally at least one catalyst. Oxidizing agents are typically air or other oxygen-containing gases, ozone or hydrogen peroxide. Air is preferred. Oxidation catalysts are typically activated carbons, silica gel, molecular sieves, vanadium-zinc or chromium-zinc catalysts, or titanium dioxide. In a further preferred embodiment, one or more UV lamps located within the oxidizing vessel may accelerate the oxidation. The oxidizing units 5 are preferably pipelines, more preferably in coiled embodiments, into which UV emitters are mounted in such a way that the stream to be oxidized is contact-irradiated with UV light, intensively and for as long as possible.

Preferred embodiments of an oxidizing unit 5 are shown in FIGS. 7 and 7a. Oxidizing unit 5 has at least inlet 51 for the second nitrogen oxide-containing stream, an outlet 52 for the oxidized second nitrogen oxide-containing stream NOX-2, an inlet 55 for an oxidizing agent, and an oxidizing vessel 56. Oxidizing unit 5 optionally additionally has an irradiating unit 53, preferably a UV irradiating unit and/or one or more oxidation catalysts 54. In one alternative embodiment, inlet 51 and/or inlet 55 and/or outlet 52 in the reaction vessel 56 may also be designed such that they are realized by the same opening, by one inlet for outlet for each individual reactant and/or product, or by any desired combination thereof.

Described below is the implementation of step e) of the process of the invention by way of example in an oxidizing unit 5. To carry out step e) of the process of the invention, the second nitrogen oxide-containing stream NOX-2 from reactor 2 is transported by outlet 212 via the line L-4, which communicates with inlet 51, to the oxidizing unit 5. The oxidation of the second nitrogen oxide-containing stream NOX-2 takes place in oxidizing vessel 56. Advantageous for the oxidation is the presence of a second nitrogen oxide-containing stream NOX-2 with a temperature of 20 to 300° C. Either the stream to be oxidized is brought to the temperature required for oxidation by heating, or the stream to be oxidized already has the required temperature as it is, as a result of the preceding operating step. The oxidation is carried out generally under atmospheric pressure, but may also be accelerated by a higher pressure of the gas in the oxidizing agent. Typically the oxidation is carried out under pressures of 0.08 MPa to 2 MPa, preferably from 0.08 MPa to 1 MPa. Via inlet 55 an oxidizing agent is passed into the oxidizing vessel 56. During the oxidation, NO in the second nitrogen oxide-containing stream NOX-2 is oxidized to $NO_2$, giving an oxidized second nitrogen oxide-containing stream NOX-2-OX. Following the oxidation, the oxidized second nitrogen oxide-containing stream NOX-2-OX is transported from outlet 52 via a line L-5, which communicates with inlet 41 or 61, to scrubber 4 or 6 (see FIG. 1).

In the at least one scrubber 4 and/or 6, according to step f), the first nitrogen oxide-containing stream and, where step c) has been carried out according to variant II, the third nitrogen oxide-containing stream as well, and also the oxidized second nitrogen oxide-containing stream from step e), are contacted with an aqueous wash phase to generate a precleaned gas stream and a nitric acid-enriched wash phase.

As at least one scrubber 4 and/or 6 it is possible to use scrubbers of the kind sufficiently well known to the skilled person for such waste gas cleaning steps. The scrubbers 4 or 6 have at least one inlet for a first nitrogen oxide-containing stream and/or for an oxidized second nitrogen oxide-containing stream and/or for a third nitrogen oxide-containing stream, an inlet for an aqueous wash phase, an outlet for an $HNO_3$-enriched wash phase, and an outlet for a precleaned gas flow.

The scrubbers 4 or 6 are typically gas scrubbers, in which a gas phase is contacted with a liquid phase, preferably with an aqueous wash phase. One of the components of the gas phase is the gas which is to be removed from the gas phase. The gas to be removed dissolves well in the liquid phase or reacts with the liquid phase to give a dissolved reaction product. The liquid phase is typically water, aqueous alkali metal and alkaline earth metal hydroxide solutions, dilute hydrogen peroxide-solution or nitric acid.

The liquid phase is either in the bottom of the gas scrubber or is introduced into the interior of the gas scrubber in such a way as to greatly increase the surface area of the liquid phase, by spraying or atomizing, for example. Examples of such scrubbers are spray scrubbers, spray condensation scrubbers, cross-flow scrubbers or countercurrent-flow scrubbers. If the liquid phase is in the bottom of the gas scrubber, the gas phase is introduced into the liquid phase in such a way that the gas phase has the maximum contact area, for example by introduction using a special nozzle or by substantial mixing of the two phases. Examples of such gas scrubbers are packed scrubbers.

Preference is given to scrubbers 4 and/or 6 which are operated with neutral media such as water or acidic media such as nitric acid, or mixtures thereof, as aqueous phase. This has the advantage that the nitrogen dioxide or dinitrogen pentoxide produces nitric acid, which can be returned to the operation.

Preferred embodiments of the scrubber 4 or 6 are shown in FIGS. 8 and 8a. In one embodiment the scrubbers 4 or 6 have at least one inlet for a first nitrogen oxide-containing stream and/or for an oxidized second nitrogen oxide-containing stream and/or for a third nitrogen oxide-containing stream, a scrubbing column, an inlet for an aqueous wash phase, an outlet for a nitric acid-enriched wash phase, and an outlet for a precleaned gas stream. A further embodiment of the scrubber 4 or 6 additionally has a regulating valve which communicates with the inlet of the aqueous wash phase and with the outlet for the nitric acid-enriched wash phase.

Described below is the implementation of step f) of the process of the invention by way of example in a scrubber 4 or 6. The aqueous wash phase WP is introduced via the inlet 412 or 612 into the scrubbing column 41 or 61, where it is finely distributed, via suitable means, over the interior of the scrubbing column 41 or 61. The first nitrogen oxide-containing stream NOX-1 and/or the oxidized second nitrogen oxide-containing stream NOX-2-OX and/or the third nitrogen oxide-containing stream NOX-3 are introduced via the inlet 411 or 611 into the scrubbing column 41 or 61, where they are contacted with the aqueous wash phase WP. The nitric acid-enriched wash phase WP-1, produced after the contacting of the nitrogen oxide-containing streams NOX-1, NOX-2-OX and/or NOX-3, is either transported via a line to a vessel, and/or transported again as aqueous wash phase WP via the inlet 412 or 612 into the scrubbing column, where it is again contacted with the nitrogen oxide-containing streams NOX-1, NOX-2-OX and/or NOX-3. This results in an increase in the nitric acid content of the nitric acid-enriched wash phase WP-1 continually, until the content has reached a desired value. Then, in a further preferred embodiment, the wash phase WP-1 thus enriched with nitric acid is returned, according to step i) of the process of the invention, to steps a) and/or b) and/or c). In a further preferred embodiment of the process, the nitric acid-enriched wash phase WP-1 is stored in one or more vessels until its next use. In a further preferred embodiment of the process, the nitric acid-enriched wash phase WP-1 is transported out of the outlet 414 or 614 of the scrubbing column 41 or 61 and is transported again via the line L-41 or L-61 and via the inlet 412 or 612 into the scrubbing column. Integrated into the line L-41 or L-61 is a multi-way valve that allows the aqueous wash phase WP to be metered into the line L-41 or L-61, and allows nitric acid-enriched wash phase WP-1 to be withdrawn from the line L-41 or L-61. In a further embodiment of the scrubber 4, inlet 411 and/or inlet 412 and/or outlet 413 and/or outlet 414 may also be designed such that they are realized by the same opening, by one inlet or outlet for each individual reactant and/or product, or by any desired combination thereof. In a further embodiment of the scrubber 6, inlet 611 and/or inlet 612 and/or outlet 613 and/or outlet 614 may also be designed such that they are realized by the same opening, by one inlet or outlet for each individual reactant and/or product, or by any desired combination thereof.

Figure 1:
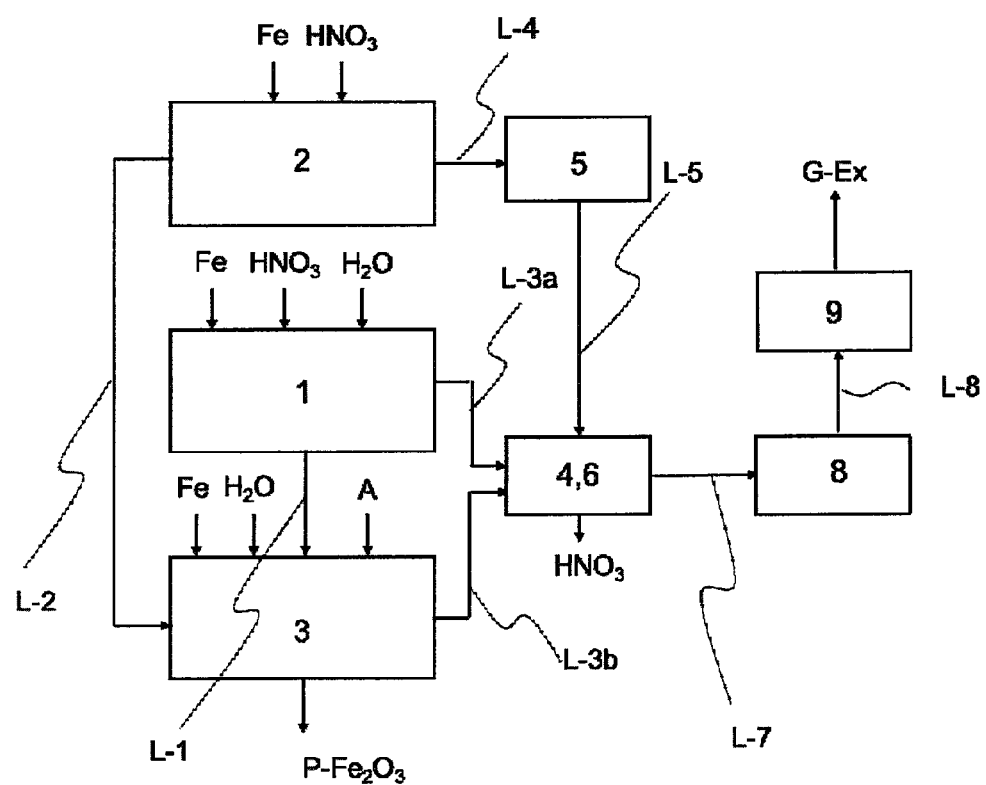
FIG. 1 shows the representation of a simple inventive apparatus having three reactors, an oxidizing unit, a scrubber, a heater and a waste gas cleaning unit.

After the scrub, in one embodiment, the precleaned gas stream NOX-4 is transported from outlet 413 or 613, via a line L-7 that communicates with inlet 81, to the heater 8 (see FIG. 1). In a further embodiment, the precleaned gas stream NOX-4, after the scrub, is transported from outlet 413 or 613, via a line L-6a or L-6b, that communicates with inlet 71, to the heat exchanger 7 (see FIG. 2).

In one preferred embodiment of the apparatus, heat exchanger 7 is connected between the scrubbers 4 and/or 6 and the heater 8.

In heat exchanger 7, in step g) i), in a preferred embodiment of the process of the invention, the precleaned gas stream is preheated to a temperature of 250 to 500° C., more preferably to 300 to 450° C.

As at least one heat exchanger 7 it is possible to use heat exchangers of the kind sufficiently well known to the skilled person for such process steps. The at least one heat exchanger 7 has at least one inlet for a precleaned gas stream, an outlet for a preheated precleaned gas stream, an inlet for a cleaned waste gas, and an outlet for a cooled cleaned waste gas.

The heat exchangers 7 are typically means in which there is a heat transition from a stream having a higher temperature to a stream having a lower temperature, or vice versa. This heat transfer may be direct, indirect or semi-indirect. A typical example of a direct heat transfer is, for example, a wet cooling tower. A typical example of an indirect heat transfer is, for example, a recuperator. A typical example of a semi-indirect heat transfer is, for example, a thermal wheel. Heat exchangers used are typically tube-bundle or plate-type heat exchangers. In such heat exchangers, the geometric passage of the different streams may be in counter-current, in co-current or in cross-flow.

One preferred embodiment of a heat exchanger 7 is shown in FIG. 9. Heat exchanger 7 has at least inlet 71 for a precleaned gas stream NOX-4, an outlet 72 for a preheated precleaned gas stream NOX-5, an inlet for 73 for a cleaned waste gas G-1, and an outlet 74 for a cooled cleaned waste gas G-EX.

Described below is the implementation of step g) i) of the process of the invention by way of example in a heat exchanger 7. The precleaned gas stream NOX-4 is transported from outlet 413 of the scrubber 4 and/or outlet 613 of the scrubber 6 via at least one line L-6a and/or L-6b to inlet 71 in the heat exchanger 7. In the heat exchanger 7, the heat of the cleaned waste gas G-1, which is transported from outlet 924 of the waste gas cleaning unit 9 (the detailed description of the waste gas cleaning unit 9 follows later on below) via a line L-9 to inlet 73 of the heat exchanger 7, is utilized for heating the precleaned gas stream NOX-4. The precleaned gas stream thus preheated, NOX-5, leaves heat exchanger 7 via outlet 72 and is transported via a line L-7 to inlet 81 of the heater 8. As a result of the passage of the heat of the cleaned waste gas G-1 to the precleaned gas stream NOX-4, the cleaned waste gas G-1 is cooled and leaves the heat exchanger 7 via outlet 74 as cooled cleaned waste gas G-EX, which can thereafter be emitted to the ambient air, preferably via a chimney.

In the at least one heater, according to step g), the precleaned gas stream from step f) is heated to a temperature of 200 to 1400° C. In this context, some of the nitrogen oxides, preferably dinitrogen monoxide, is already removed from the precleaned gas stream.

As at least one heater 8 it is possible to use heaters of the kind sufficiently well known to the skilled person for such steps.

Heaters are typically means which raise the temperature of a stream. The stream may be heated directly or indirectly. An example of a direct heater is a gas fan burner in which the hot combustion gases cause direct heating of the gas stream mixed with them. An indirect heating means is, for example, an electrical heating element, such as a heating coil. Heaters 8 typically comprise at least one inlet for the precleaned gas stream, an outlet for a preheated precleaned gas stream, a heating chamber and at least one heating element, preferably a fan burner.

One preferred embodiment of a heater 8 is shown in FIG. 10. Heater 8 has at least one inlet 81 for the precleaned gas stream NOX-4 or the preheated, precleaned gas stream NOX-5, at least one outlet 82 for a heated precleaned gas stream NOX-6, at least one heating chamber 83 and at least one heating element 84, preferably a gas fan burner.

Described below is the heating of the precleaned gas stream to a temperature of 200 to 1400° C. in accordance with step g) of the process of the invention, by way of example in a heater 8. To carry out the heating of the precleaned gas stream to a temperature of 200 to 1400° C., in one embodiment (see FIG. 1), the precleaned gas stream NOX-4 is transported from the outlet 413 and/or 613 of the scrubbers 4 and/or 6 via a line L-7, which communicates with inlet 81, to the inlet 81 of the heater 8. In a further embodiment (see FIG. 2), the preheated, precleaned gas stream NOX-5 is transported from the outlet 72 of the heat exchanger via a line L-7, which communicates with inlet 81, to the inlet 81 of the heater 8. Preference is given to direct heating of the precleaned gas stream NOX-4 or of the preheated precleaned gas stream NOX-5 by means of a gas fan burner. The precleaned gas stream NOX-4 or the preheated precleaned gas stream NOX-5 is heated here to the temperature required in waste gas cleaning unit 10, of 250 to 500° C. in the presence of at least one catalyst and/or of 800 to 1400° C. in the absence of a catalyst, and then, as heated precleaned gas stream NOX-6, leaves the heater 8 via the outlet 82 and is transported via a line L-8 to the inlet 911 of the waste gas cleaning unit 9.

In the at least one waste gas cleaning unit 9, according to step g), nitrogen oxides are removed from the precleaned gas stream from step f) by heating to a temperature of 200 to 1400° C., optionally in the presence of a catalyst, preferably of 250 to 500° C. in the presence of a catalyst or of 800 to 1400° C. in the absence of a catalyst, producing a cleaned gas stream.

As at least one waste gas cleaning unit 9 it is possible to use waste gas cleaning units of the kind sufficiently well known to the skilled person for such cleaning operations.

Waste gas cleaning units 9 are typically means which remove unwanted gaseous substances, such as nitrous gases, for example, by catalytic reduction, and/or which remove dinitrogen monoxide by thermal decomposition over one or more catalysts. These waste gas cleaning units are also called SCR (SCR=Selective Catalytic Reduction) reactors.

The at least one waste gas cleaning unit 9 typically has at least one reactor, at least one inlet for a heated precleaned gas stream, at least one catalyst, and at least one outlet for a cleaned gas stream.

In a further preferred embodiment, the at least one waste gas cleaning unit 9 additionally has an evaporator with an inlet for a heated precleaned gas stream, a liquid distributor for urea and/or ammonia, and an outlet for a heated, precleaned gas stream which is enriched with urea and/or ammonia and which, in this preferred embodiment, communicates via a line with the inlet in the reactor.

One preferred embodiment of a waste gas cleaning unit 9 is shown in FIG. 11. The at least one waste gas cleaning unit 9 has at least one reactor 92, at least one inlet 921 for a heated precleaned gas stream NOX-6, at least one catalyst 922, and at least one outlet 924 for a cleaned gas stream G-1. Catalyst 922 may be either a catalyst for the decomposition of nitrous gases and/or for the decomposition of dinitrogen monoxide.

A further preferred embodiment of a waste gas cleaning unit 9 is shown in FIG. 11a. The at least one waste gas cleaning unit 9 additionally has an evaporator 91 with an inlet for 911 for a heated, precleaned gas stream NOX-6, an inlet 912 for urea and/or ammonia U, a liquid distributor 913 for urea and/or ammonia U, and an outlet 914 for a heated, precleaned gas stream NOX-7 which is enriched with urea and/or ammonia and which communicates via a line L-91 with the inlet 921 in the reactor 92.

A further preferred embodiment of a waste gas cleaning unit 9 is shown in FIG. 11b. The at least one waste gas cleaning unit 9 additionally has a catalyst 923. Catalyst 923 may be either a catalyst for the decomposition of nitrous gases and/or for the decomposition of dinitrogen monoxide.

Described below is the implementation of step g) of the process of the invention by way of example using a waste gas cleaning unit 9 in accordance with FIG. 11b. To carry out the step g) of the process of the invention, the heated precleaned gas stream NOX-6 from heater 8 is transported from the outlet 82 via the line L-8 and inlet 911 into the evaporator 91 of the waste gas cleaning unit 9. At the same time, via the inlet 912, ammonia or urea U is sprayed via the liquid distributor 913 into the evaporator 91, and thereby mixed with the heated precleaned gas stream NOX-6. The ammonia-enriched or urea-enriched gas stream NOX-7 is transported via the outlet 914 from the evaporator 9 via a line L-91 and inlet 921 into the reactor 92. There the ammonia-enriched or urea-enriched gas stream NOX-7 is contacted with catalyst 922 and/or catalyst 923. The amount of nitrous gases and dinitrogen monoxide is reduced at this stage as described above under step g). The cleaned stream G-1 leaves the reactor 92 via the outlet 924 and is transported via a line L-9 and the inlet 73 into the heat exchanger 7, in which, in accordance with step i) of the process of the invention, it gives up some of its heat to the precleaned gas stream NOX-4, which is preheated as a result. Through the transition of the heat of the cleaned waste gas G-1 to the precleaned gas stream NOX-4, the cleaned waste gas G-1 is cooled, and leaves the heat exchanger 7 via outlet 74 in the form of cooled cleaned waste gas G-EX.

The cooled cleaned waste gas G-EX which emerges from the outlet 74 from the heat exchanger 7 contains only a small residual fraction of nitrous gases and dinitrogen monoxide. Moreover, a large part of the heat stored in it was returned back to the process, i.e. to the precleaned gas stream NOX-4.

The cooled cleaned waste gas G-EX can therefore be given off to the ambient air via a stack, a chimney or another suitable means.

In the at least one wastewater cleaning unit 10, in accordance with step h), ammonium compounds, nitrite compounds and nitrate compounds are removed from the aqueous phase from step d). As at least one wastewater cleaning unit 10 it is possible to use wastewater cleaning units of the kind sufficiently well known to the skilled person for such process steps.

In the at least one wastewater cleaning unit 10, in accordance with step h), ammonium compounds, nitrite compounds and nitrate compounds are removed from the aqueous phase from step d).

As at least one wastewater cleaning unit 10 it is possible to use wastewater cleaning units of the kind sufficiently well known to the skilled person for such cleaning steps. The at least one wastewater cleaning unit 10 has at least one unit for biological denitrification, and/or a unit for coagulation and/or a unit for flocculation and/or a unit for sedimentation. Units for biological denitrification are typically vessels or tanks in which the wastewater to be cleaned is contacted with microorganisms under conditions in which the microorganisms are able desirably to convert the nitrogen-containing impurities.

Units for coagulation are typically vessels or tanks in which the wastewater to be cleaned is mixed with coagulants. Coagulants are chemical compounds which neutralize an electrical charge on the part of impurities present in the wastewater. Through the neutralization of the electrical charge, finely suspended particulate solids are able to adhere to one another. This step requires, preferably, intensive mixing of the wastewater with the coagulants, preferably by means of high-speed mixers. Coagulants are, for example, aluminium chlorides, aluminium sulphate, sodium aluminate, iron chloride, iron sulphate, calcium hydroxide or cationic polyelectrolytes, preferably polyamines and polyaluminium chlorides.

Units for flocculation are typically vessels or tanks in which the wastewater to be cleaned is mixed with flocculating agents. Flocculating agents are preferably organic or inorganic polymers which promote the flocculation of the particles coagulated beforehand, more preferably polyacrylamides.

Units for sedimentation are typically vessels or tanks in which the wastewater for optional cleaning is mixed with flocculating agents. Flocculating agents are preferably organic or inorganic polymers which promote the flocculation of the particles coagulated beforehand, more preferably polyacrylamides.

One preferred embodiment of a wastewater cleaning unit 10 is shown in FIG. 12. Wastewater cleaning unit 10 has at least one unit 101 for biological denitrification, a unit 102 for coagulation, flocculation and sedimentation, and a unit 103 for filtration, ultrafiltration and reverse osmosis. Unit 101 for biological denitrification has at least one inlet 1011 for the wastewater AQ-1 which is obtained from the preparation of the pigment suspension, and an outlet 1012 for the wastewater AQ-2 which is obtained from the biological denitrification of the wastewater AQ-1.

Unit 102 for coagulation, flocculation and sedimentation has at least one inlet 1021 for the wastewater AQ-2, and an outlet 1012 for the wastewater AQ-3 which is obtained from coagulation, flocculation and/or sedimentation of the wastewater AQ-2.

Unit 103 for filtration, ultrafiltration and reverse osmosis has at least one inlet 1031 for the wastewater AQ-3, and an outlet 1032 for the cleaned wastewater AQ-EX which is obtained from filtration, ultrafiltration and reverse osmosis of the wastewater AQ-3.

Outlet 1012 and inlet 1021 communicate with one another via a line L-101. Outlet 1022 and inlet 1031 communicate with one another via a line L-102.

Described below is the implementation of step h) by way of example in a wastewater cleaning unit 10.

To implement step h) of the process of the invention, the wastewater AQ-1 from the preparation of the pigment suspension is transported from reactor 3 via outlet 343 of the isolating means 34 via a line L-10 and inlet 1011 into the unit 101 for biological denitrification. There, as described under step h), the ammonium compounds present in the wastewater AQ-1 are oxidized to nitrate under aerobic conditions, and the nitrate compounds are reduced enzymatically in the subsequent step, under unaerobic conditions, to form molecular nitrogen, producing the cleaned wastewater AQ-2.

The wastewater AQ-2 thus cleaned leaves unit 101 via outlet 1012 and is transported via a line L-101 to inlet 1021 into the unit 102 for coagulation/flocculation/sedimentation, where it is purified further as described under step h), producing the cleaned wastewater AQ-3.

The wastewater AQ-3 thus cleaned leaves unit 102 via outlet 1022 and is transported via a line L-102 to inlet 1031 into the unit 103 for filtration, ultrafiltration and reverse osmosis, where it is purified further as described under step h), producing the cleaned wastewater AQ-EX.

The cleaned wastewater AQ-EX which emerges from the outlet 1032 of the unit 103 for filtration/ultrafiltration/reverse osmosis now contains only a small fraction of the impurity it originally contained. The cleaned wastewater AQ-EX can therefore be delivered via wastewater sewers into the wastewater systems, or stored temporarily in vessels, before being returned at a later point in time back to one of the process steps requiring water.

With the process of the invention and the apparatus of the invention in which the process of the invention is conducted, then, it is possible to produce red iron oxide pigments by the Penniman process with nitrate in high quality, in high yields, energy-efficiently, and with avoidance of waste gases and wastewaters containing unwanted reaction products such as nitrous gases, dinitrogen monoxide, iron-containing compounds and sulphur-containing compounds.

The invention claimed is:

1. A process for producing red iron oxide pigments, the process comprising:
   a) contacting iron and nitric acid to produce;
      an iron(II) nitrate solution comprising nitrogen-containing byproducts, and
      a first nitrogen oxide-containing stream comprising nitrous gases and dinitrogen monoxide,
   b) contacting iron and nitric acid to produce;
      an aqueous haematite nucleus suspension comprising nitrogen-containing byproducts, and
      a second nitrogen oxide-containing stream comprising nitrous gases and dinitrogen monoxide,
   c) contacting the aqueous haematite nucleus suspension from step b) with the iron(l) nitrate solution from step a) in the presence of at least one of:
      I. at least one alkaline precipitant in the presence of at least one oxygen-containing gas, and
      II. in the presence of at least one oxygen-containing gas,
   to produce:
      a third nitrogen oxide-containing stream comprising nitrous gases and dinitrogen monoxide, and
      an aqueous suspension comprising red haematite pigment and nitrogen-containing byproducts comprising nitrate compounds, nitrite compounds, and ammonium compounds,
   d) separating the red haematite pigment from the aqueous suspension to leave an aqueous phase comprising the nitrogen containing components,
   e) oxidizing the second nitrogen oxide-containing stream from step b) to produce an oxidized second nitrogen oxide-containing stream,
   f) contacting the first nitrogen oxide-containing stream and/or the third nitrogen oxide-containing stream and/or the oxidized second nitrogen oxide-containing stream from step e) with an aqueous wash phase to produce:
      a prepurified gas stream comprising nitrous gases and dinitrogen monoxide, and
      a wash phase enriched with nitric acid, and
   g) heating the prepurified gas stream from step f) to a temperature of 200 to 1400° C., to remove dinitrogen monoxide and/or nitrous gases from the gas stream and produce a purified gas stream.

2. The process for producing red iron oxide pigments according to claim 1, further comprising:
   h) removing at least ammonium compounds and/or nitrite compounds and/or nitrate compounds from the aqueous phase from step d) to produce a purified wastewater.

3. The process for producing red iron oxide pigments according to claim 1, further comprising one or more of:
   i) returning the nitric acid-enriched wash phase formed in step f) to step a), b) and/or c), and
   j) utilizing the heated purified gas stream from step g) to preheat the prepurified gas stream from step f) to form a preheated, prepurified gas stream and a cooled, purified waste gas.

4. The process for producing red iron oxide pigments according to claim 1, wherein:
   step a) further comprises reacting 0.4 to 10 mol of the iron per mol of the nitric acid at a temperature of 60° C. or less to produce the iron(II) nitrate solution; and
   step b) further comprises reacting the iron and nitric acid such that a reaction temperature on exposure of the iron to the nitric acid is at least 90° C.

5. The process for producing red iron oxide pigments according to claim 4, wherein:
   the temperature in step a) is 10 to 60° C., and step a) further comprises separating any unreacted iron from the prepared iron(II) nitrate solution; and
   the reaction temperature on exposure of the iron to the nitric add in step b) is 90 to 99° C., and step b) further comprises separating any unreacted iron from the prepared aqueous haematite nucleus suspension.

6. The process for producing red iron oxide pigments according to claim 1, wherein step b) further comprises:
   adding the nitric acid to a mixture of the iron and water having a temperature from 60 to 120° C.,
   where haematite nuclei present in the aqueous haematite nucleus suspension have a particle size of less than or equal to 100 nm and a specific BET surface area of 40 $m^2/g$ to 150 $m^2/g$, measured according to DIN 66131.

7. The process for producing red iron oxide pigments according to claim 6, wherein:
   dilute nitric acid is added to the mixture of iron and water at a rate of addition sufficient to heat the reaction mixture by at least 15° C. within less than 120 minutes after the end of the addition of nitric acid, and the process further comprises separating any unreacted iron from the aqueous haematite nucleus suspension.

8. The process for producing red iron oxide pigments according to claim 1, wherein:
variant I. of step c) further comprises contacting the aqueous haematite nucleus suspension with the iron(II) nitrate solution and the alkaline precipitant in the presence of the at least one oxygen-containing gas at a temperature of 70 to 100° C., wherein the iron(II) nitrate solution from step a) and the at least one alkaline precipitant are metered in to the haematite nucleus suspension to form a reaction mixture, and the reaction mixture Is oxidized with the at least one oxygen-containing gas until the red haematite pigment achieves a desired color shade; and
variant II. of step c) further comprises contacting the haematite nucleus suspension with the iron and the iron(II) nitrate solution at a temperatures of 70 to 100° C. to produce a reaction mixture, and oxidizing the reaction mixture with the at least one oxygen-containing gas, until the red haematite pigment achieves the desired color shade.

9. The process for producing red iron oxide pigments according to claim 1, wherein:
variant I. of step c) further comprises contacting the aqueous haematite nucleus suspension with the iron(II) nitrate solution and the alkaline precipitant in the presence of the at least one oxygen-containing gas at a temperature of 75 to 90° C., wherein the iron(II) nitrate solution from step a) and the at least one alkaline precipitant are metered in to the haematite nucleus suspension to form a reaction mixture, the at least one oxygen containing gas is air, and the reaction mixture is oxidized with the air, at a rate of 0.2 to 100 liters of the air, per hour and per liter of suspension, until the red haematite pigment achieves a desired color shade; and
variant II. of step c) further comprises contacting the haematite nucleus suspension with the iron and the iron(II) nitrate solution at a temperature of 75 to 90° C. to produce a reaction mixture, the at least one oxygen containing gas is air, and oxidizing the reaction mixture with 0.2 to 100 liters of the air, per hour and per liter of suspension, until the red haematite pigment achieves a desired color shade.

10. The process for producing red iron oxide pigments according to claim 1, wherein step d) further comprises:
separation of the haematite pigment-from the suspension by at least one of filtration, sedimentation, and centrifugation to produce a filtercake,
washing of the filtercake and subsequent drying of the filtercake, and
one or more screening steps with different mesh sizes and with descending mesh sizes, carried out optionally before the red haematite pigment is isolated from the aqueous phase.

11. The process for producing red iron oxide pigments according to claim 10, wherein step d) further comprises adding at least one sulphate salt, and/or an alkali metal sulphate or alkaline earth metal sulphate to the haematite pigment suspension during or before the screening and/or during or before the separation.

12. The process for producing red iron oxide pigments according to claim 1, wherein step e) further comprises contacting the second nitrogen oxide-containing stream from step b) with at least one oxidizing agent, optionally in the presence of one or more catalysts and/or of high-energy radiation.

13. The process for producing red iron oxide pigments according to claim 1, wherein step e) further comprises contacting the second nitrogen oxide-containing stream from step b) with at least one oxidizing agent selected from the group consisting of air, oxygen, ozone and hydrogen peroxide in the presence of one or more catalysts and/or UV radiation.

14. The process for producing red iron oxide pigments according to claim 1, wherein:
the second nitrogen oxide-containing stream from step b) contains from 1 to 2000 g/m$^3$ of nitrous gases (calculated as g/m$^3$ NO$_2$) and/or from 0.5 to 2000 g/m$^3$ of dinitrogen monoxide; and
the oxidized second nitrogen oxide-containing stream obtained after step f) contains not more than 50% of the original fraction of nitrogen monoxide present prior to step f).

15. The process for producing red iron oxide pigments according to claim 14, wherein the oxidized second nitrogen oxide-containing stream obtained after step f) contains less than 15% of the original fraction of nitrogen monoxide present prior to step f).

16. The process for producing red iron oxide pigments according to claim 1, wherein:
step g) further comprises:
Increasing the temperature of the prepurified gas stream obtained according to step f) first to 250 to 500° C. in the presence of a catalyst, and subsequently to 800 to 1400° C. in the absence of a catalyst;
contacting the prepurified gas stream from step f) with ammonia or with a chemical compound that breaks down to give ammonia, in the presence of one or more catalysts, which may optionally be disposed on a support, and
the purified waste gas has a concentration of 0.001 to 0.3 g/m$^3$ of nitrous gases (calculated as NO$_2$), and/or 0.001 to 0.3 g/m$^3$ dinitrogen monoxide.

17. The process for producing red iron oxide pigments according to claim 2, wherein step h) further comprises removing ammonium compounds, nitrate compounds, nitrite compounds, iron-containing compounds and/or sulphur-containing compounds from the aqueous phase from step d) by at least one of oxidative precipitation, denitrification, coagulation, flocculation, sedimentation, filtration, ultrafiltration, and reverse osmosis.

18. The process for producing red iron oxide pigments according to claim 11, wherein:
step c) and/or step d) is carried out in the presence of sulphate salts,
the process further comprises removing of at least ammonium compounds and/or nitrite compounds and/or nitrate compounds from the aqueous phase from step d to produce a salt-enriched wastewater, and
the salt-enriched wastewater is recycled back into step c) and/or step d).

19. Apparatus for producing the red iron oxide pigments according to the process of claim 1, the apparatus comprising:
a first reactor configured for contacting the iron and the nitric acid to produce the iron(II) nitrate solution and first nitrogen oxide-containing stream of step a), a second reactor configured for contacting the iron and the nitric acid to produce aqueous haematite nucleus suspension and the second nitrogen oxide-containing stream of step b), a third reactor configured for receiving the aqueous haematite nucleus suspension from step b) and the iron(II) nitrate solution from step a) and contacting the aqueous haematite nucleus suspension and the iron(II) nitrate solution with at least one of:
  I. at least one alkaline precipitant in the presence of at least one oxygen-containing gas, and
  II. iron in the presence of at least one oxygen-containing gas,
  to produce the third nitrogen oxide-containing stream and the aqueous suspension of red haematite pigment of step c), at least one scrubber in communication with:
  (a) the first reactor via at least one first fluid line for receiving the first nitrogen oxide-containing stream of step a),
  (b) the third reactor via at least one third fluid line for receiving the third nitrogen oxide-containing stream of step c), and
  (c) the second reactor via at least one second fluid line in conjunction with at least one oxidizing unit, wherein the at least one oxidizing unit receives the second nitrogen oxide-containing stream of step b), and oxidizes the stream to produce the oxidized second nitrogen oxide-containing stream of step e), and the scrubber receives the oxidized second nitrogen oxide-containing stream,
  for washing the first, second and third streams with the aqueous wash phase to produce the prepurified gas stream and the wash phase enriched with nitric acid of step f), and a waste gas purifying unit in communication with the scrubber for receiving the prepurified gas stream from the scrubber, the waste gas purifying unit comprising a heater for heating the prepurified gas stream from step f) to the temperature of 200 to 1400° C., wherein the waste gas purifying unit removes the dinitrogen monoxide and/or nitrous gases from the gas stream to produce the purified gas stream.

20. The apparatus according to claim 19, further comprising:

at least one separation device in communication with the third reactor for receiving the aqueous haematite pigment suspension and separating the red hematite pigment from the aqueous haematite pigment suspension;

at least one wastewater purifying unit in communication with the third reactor and/or with the at least one separation device for receiving the aqueous phase of the suspension and removing at least ammonium compounds and/or nitrite compounds and/or nitrate compounds from the aqueous phase to produce purified wastewater; and at least one heat exchanger in communication with at least the scrubber and the waste gas purifying unit for exchanging heat from the heated purified gas stream exiting the waste gas purifying unit with the prepurified gas stream from the scrubber to preheat the prepurified gas stream and cool the purified gas stream.

\* \* \* \* \*

UNITED STATES PATENT AND TRADEMARK OFFICE
CERTIFICATE OF CORRECTION

PATENT NO. : 10,221,326 B2
APPLICATION NO. : 15/034218
DATED : March 5, 2019
INVENTOR(S) : Waldemar Czaplik et al.

Page 1 of 1

It is certified that error appears in the above-identified patent and that said Letters Patent is hereby corrected as shown below:

On the Title Page

Item (72), the inventors should read as follows:
-- Waldemar Czaplik, Juergen Kischkewitz, Wolfgang Oehlert, Huajun Li, Udo Holtmann, Birgit Blankemeyer-Menge, Guido Ketteler, Alfred Bardoun --

Signed and Sealed this
Twenty-fourth Day of September, 2019

Andrei Iancu
*Director of the United States Patent and Trademark Office*